US007673240B2

(12) United States Patent  
Morgan

(10) Patent No.: US 7,673,240 B2  
(45) Date of Patent: Mar. 2, 2010

(54) UBIQUITOUS NAVBAR USER INTERFACE ACROSS MULTIPLE HETEROGENEOUS DIGITAL MEDIA DEVICES

(75) Inventor: Barrett Morgan, Salt Lake City, UT (US)

(73) Assignee: Polaroid Labs, LLC, Minnetonka, MN (US)

( * ) Notice: Subject to any disclaimer, the term of this patent is extended or adjusted under 35 U.S.C. 154(b) by 70 days.

(21) Appl. No.: 11/649,351

(22) Filed: Jan. 3, 2007

(65) Prior Publication Data

US 2007/0186180 A1 Aug. 9, 2007

Related U.S. Application Data

(60) Provisional application No. 60/755,630, filed on Dec. 30, 2005.

(51) Int. Cl.  
*G06F 3/00* (2006.01)

(52) U.S. Cl. .................. 715/717; 715/737; 715/810; 715/835; 715/840; 715/864

(58) Field of Classification Search ............. 715/717, 715/737, 738, 810, 835, 840, 864  
See application file for complete search history.

(56) References Cited

U.S. PATENT DOCUMENTS

| | | |
|---|---|---|
| 5,585,838 A | 12/1996 | Lawler et al. |
| 5,594,509 A | 1/1997 | Florin et al. |
| 5,619,249 A | 4/1997 | Billock et al. |
| 5,623,662 A | 4/1997 | McIntosh |

(Continued)

FOREIGN PATENT DOCUMENTS

GB 2 375 268 11/2002

(Continued)

OTHER PUBLICATIONS

Sursala, S. et al., "Flexible Consistency for Wide Area Peer Replication", IEEE 2005; 25th IEEE International Conference, pp. 199-208.

*Primary Examiner*—Sy D Luu  
(74) *Attorney, Agent, or Firm*—Patterson, Thuente, Skaar & Christensen, P.A.

(57) ABSTRACT

A method of providing a ubiquitous navigation and program guide user interface that is common across a heterogeneous multitude of digital media devices. A navbar user interface persistently displays across a topmost portion of a display for each of the heterogeneous multitude of digital media devices when the digital media device is operating in a mode other than a full screen display of digital media content. The navbar user interface presents a limited set of icons associated with a navigation and media guide user interface for different kinds of digital media content and device operations that are common across the heterogeneous multitude of digital media devices. The navbar user interface is operated in a scrolling manner to display and select a navigation and media guide interface for a desired one of the different kinds of digital media content and device operations by selecting an associated one of the limited set of icons. Upon selection of the desired kind of digital media content, the navigation and media guide interface for the desired one of the different kinds of digital media content is displayed in a grid format that is consistent across the heterogeneous multitude of digital media devices.

20 Claims, 36 Drawing Sheets

U.S. PATENT DOCUMENTS

| | | |
|---|---|---|
| 5,995,982 A | 11/1999 | Mercer |
| 6,300,947 B1 * | 10/2001 | Kanevsky .................... 715/866 |
| 6,390,371 B1 * | 5/2002 | Armga et al. .......... 235/472.01 |
| 6,407,779 B1 | 6/2002 | Herz |
| 6,642,941 B1 * | 11/2003 | Kurata et al. ................. 715/733 |
| 6,832,353 B2 * | 12/2004 | Itavaara et al. ............... 715/744 |
| 6,832,386 B1 | 12/2004 | Jerding et al. |
| 6,883,143 B2 * | 4/2005 | Driskell ....................... 715/763 |
| 6,993,575 B2 * | 1/2006 | Abkowitz et al. ............ 709/220 |
| RE39,059 E * | 4/2006 | Foster ......................... 715/744 |
| 7,024,256 B2 | 4/2006 | Krzyzanowski et al. |
| 7,085,835 B2 | 8/2006 | Bantz et al. |
| 7,124,097 B2 | 10/2006 | Claremont et al. |
| 7,203,965 B2 | 4/2007 | Lakamp et al. |
| 7,206,766 B2 | 4/2007 | Vidich et al. |
| 7,240,289 B2 * | 7/2007 | Naughton et al. ........... 715/740 |
| 7,266,198 B2 | 9/2007 | Medvinsky |
| 7,277,950 B1 | 10/2007 | Chapweske |
| 7,281,274 B2 | 10/2007 | Manning et al. |
| 7,340,689 B2 * | 3/2008 | Berstis ....................... 715/801 |
| 7,346,917 B2 | 3/2008 | Gatto et al. |
| 7,380,236 B2 * | 5/2008 | Hawley ...................... 717/109 |
| 2001/0037376 A1 | 11/2001 | Ullman et al. |
| 2002/0073204 A1 | 6/2002 | Dutta et al. |
| 2002/0080166 A1 * | 6/2002 | Sweatt et al. ................. 345/738 |
| 2002/0083153 A1 * | 6/2002 | Sweatt et al. ................. 709/218 |
| 2003/0048380 A1 | 3/2003 | Tamura |
| 2003/0061364 A1 | 3/2003 | Banerjee et al. |
| 2003/0131252 A1 | 7/2003 | Barton |
| 2003/0204613 A1 | 10/2003 | Hudson et al. |
| 2004/0068742 A1 | 4/2004 | Cushing et al. |
| 2004/0083463 A1 | 4/2004 | Hawley |
| 2004/0122958 A1 | 6/2004 | Wardrop |
| 2004/0143672 A1 | 7/2004 | Padmanabham et al. |
| 2004/0148344 A1 | 7/2004 | Navar et al. |
| 2004/0162871 A1 | 8/2004 | Pabla et al. |
| 2004/0172476 A1 | 9/2004 | Chapweske |
| 2004/0172658 A1 | 9/2004 | Rakib et al. |
| 2004/0236863 A1 | 11/2004 | Shen et al. |
| 2004/0261036 A1 * | 12/2004 | Vedbrat et al. ............... 715/779 |
| 2004/0261040 A1 * | 12/2004 | Radcliffe et al. ............. 715/840 |
| 2005/0010653 A1 | 1/2005 | McCanne |
| 2005/0086326 A1 | 4/2005 | Manning et al. |
| 2005/0091167 A1 | 4/2005 | Moore et al. |
| 2005/0120082 A1 | 6/2005 | Hesselink et al. |
| 2005/0149481 A1 | 7/2005 | Hesselink et al. |
| 2005/0169473 A1 | 8/2005 | Candelore |
| 2005/0177624 A1 | 8/2005 | Oswald et al. |
| 2005/0177745 A1 | 8/2005 | Oswald et al. |
| 2005/0177853 A1 | 8/2005 | Williams et al. |
| 2005/0203851 A1 | 9/2005 | King et al. |
| 2005/0218739 A1 | 10/2005 | Maddin et al. |
| 2005/0234864 A1 | 10/2005 | Shapiro |
| 2005/0289266 A1 * | 12/2005 | Illowsky et al. .............. 710/104 |
| 2006/0010203 A1 | 1/2006 | Mrsic-Flogel et al. |
| 2006/0064383 A1 | 3/2006 | Marking |
| 2006/0080319 A1 | 4/2006 | Hickman et al. |
| 2006/0152401 A1 | 7/2006 | Spilo |
| 2006/0240811 A1 | 10/2006 | De Luca |
| 2006/0265421 A1 * | 11/2006 | Ranasinghe et al. ....... 707/104.1 |
| 2007/0003224 A1 * | 1/2007 | Krikorian et al. ............. 386/95 |
| 2007/0186180 A1 | 8/2007 | Morgan |
| 2007/0192798 A1 | 8/2007 | Morgan |
| 2008/0040716 A1 * | 2/2008 | Lam et al. ...................... 718/1 |
| 2008/0281718 A1 | 11/2008 | Morgan |

FOREIGN PATENT DOCUMENTS

WO     WO 2005/076576 A2     8/2005

* cited by examiner

UBIQUITOUS NAVBAR USER INTERFACE ACROSS MULTIPLE HETEROGENEOUS DIGITAL MEDIA DEVICES

PRIORITY CLAIM

The present invention claims priority to the U.S. Provisional Patent Application Ser. No. 60/755,630, filed Dec. 30, 2005, and entitled "Digital Content Delivery Via Virtual Private Swarming Network (VPSN) Incorporating Secured Set-top Devices", the disclosure of which is hereby incorporated by reference.

FIELD OF THE INVENTION

The present invention relates generally to methods and systems for operator interfaces for data processing devices. More particularly, the present invention relates to methods and systems for providing a ubiquitous navigation and program guide user interface that is common across a heterogeneous multitude of digital media devices such as digital entertainment centers, personal video recorders and players, personal media players, and other digital media devices presenting digital entertainment and artistic content, such as movies, television, games, photographs and other digital media content.

BACKGROUND OF THE INVENTION

Digital technology enables more and more consumers to access and enjoy a wide variety of personal and commercial digital media content. This digital media content may take the form of home videos, Hollywood movies, digital photos, music, television and more. Consumers gain access to commercially developed digital media content through sources such as over-the-air television, cable television, and satellite television. Consumers may also download or otherwise access digital media content files via the Internet or by purchasing digital video discs (DVDs), compact discs (CDs), etc. Other kinds of digital media content files may be personally created by consumers utilizing digital cameras, digital video recorders (DVRs), computers and other digital recording devices.

The huge variety of stationary and portable media devices available in the marketplace enables a consumer to enjoy these media files at home, at work, in their automobiles, or just about anywhere. Consumers record HDTV programs on their DVRs, download MP3 files to listen to on their iPods®, swap JPEG photos taken with their digital cameras, and view DVDs on car-mounted DVD players.

Because of this explosion in available media files and devices to record and play them back, a consumer typically must learn to operate and navigate several different technology platforms and systems. For example, learning to program a DVR to record a television program can be significantly different than learning to operating an MP3 player. User interfaces, displays, menus and other navigation and access tools for digital media devices and players vary from device to device and platform to platform.

Presently, there have been two main approaches to making the user interfaces for a variety of different digital media devices easier to learn and operate. One approach is to provide a universal wireless remote control device that serves as a common controller for multiple devices and performs any necessary translation of remote control commands among differing, heterogeneous digital media devices. Examples of these kinds of universal remote control devices are described in U.S. Pat. No. 6,407,779 and U.S. Publ. Patent Appl. No. 2006/0152401 A1. The other approach is to use a common software browser or virtual software interface that can be displayed by all of the digital media devices with appropriate software infrastructure to integrate the operation of various heterogeneous digital media devices into a common framework. Examples of these kinds of common browser interface are described in U.S. Publ. Patent Appl. No. 2005/0289266 A1 and PCT Publ. No. WO 2006/022772 A2.

While the approach of a universal remote control addresses the problem of learning the buttons or pointing devices required to manually operate different kinds of digital media devices, the universal remote control cannot alter the way in which user interfaces are displayed on the various heterogeneous digital media devices under its control. Consequently, the user must learn to navigate a variety of different user interfaces on the different heterogeneous digital media devices. The approach of providing a common software browser can address the challenge of needing to learn a variety of different user interfaces; however, the common software browser often is an overkill for the amount of control and user interface information needed to operate a given digital media device, such as a personal media player and the amount of technology and software required to be provided for those devices. Perhaps more problematic is the challenge of formatting a common browser screen interface across different size screens for different kinds of digital media players.

Therefore, a need exists for a common user interface that can operate consistently across multiple heterogeneous technology platforms for digital media devices, presenting a common display to a user regardless of the type of digital media content or digital media device.

SUMMARY OF THE INVENTION

In one embodiment, the present invention is a method of providing a ubiquitous navigation and program guide user interface that is common across a heterogeneous multitude of digital media devices. A navbar user interface persistently displays across a topmost portion of a display for each of the heterogeneous multitude of digital media devices when the digital media device is operating in a mode other than a full screen display of digital media content. The navbar user interface presents a limited set of icons associated with a navigation and media guide interface for different kinds of digital media content and device operations that are common across the heterogeneous multitude of digital media devices.

The navbar user interface is operated in a scrolling manner to display and select a navigation and media guide interface for a desired one of the different kinds of digital media content and device operations by selecting an associated one of the limited set of icons. Upon selection of the desired kind of digital media content, the navigation and media guide interface for the desired one of the different kinds of digital media content is displayed in a grid format that is consistent across the heterogeneous multitude of digital media devices.

In another embodiment, the present invention is a system for a ubiquitous navigation and program guide user interface that is common across a heterogeneous multitude of digital media devices. The system includes a navbar user interface that is persistently displayed across an edge portion of a display for each of the heterogeneous multitude of digital media devices when the digital media device is operating in a mode other than a full screen display of digital media content. The navbar user interface includes a limited set of icons associated with a navigation and media guide interface for the different kinds of digital media content and device operations that are common across the heterogeneous multitude of digital media devices.

The system for a navigation and media guide interface for each of the different kinds of digital media content and device operations is selectively displayable across a portion of the display other than the edge portion and presents information about the digital media content and device operation in a grid format that is consistent across the heterogeneous multitude of digital media devices. The system also includes a user interface device that operates the navbar user interface to display the limited set of icons in a scrolling manner in a circular endless buffer in which at least three of the icons are displayed on the display. The user interface device also selects one of the navigation and media guide interfaces for a desired one of the different kinds of digital media content and device operations by selecting an associated one of the limited set of icons.

In another embodiment, the present invention is a heterogeneous multitude of digital media devices that implements a ubiquitous navigation and program guide user interface. The heterogeneous multitude of digital media devices include a plurality of different platforms of digital media devices. Each of the different platforms are selected from the set consisting of: digital entertainment center, digital video disc player, digital video recorder, compact disc player, digital music player, personal media player, set top box, video camera, digital camera, digital stereo and digital radio.

A navbar user interface that is persistently displayed across an edge portion of a display for each of the heterogeneous multitude of digital media devices when the digital media device is operating in a mode other than a full screen display of digital media content. The navbar user interface includes a limited set of icons associated with a navigation and media guide interface for different kinds of digital media content and device operations that are common across the heterogeneous multitude of digital media devices.

Each of the different kinds of digital media content and device operations is selectively displayable across a portion of the display other than the edge portion and presents information about the digital media content and device operation in a grid format that is consistent across the heterogeneous multitude of digital media devices. A user interface device operates the navbar user interface to display the limited set of icons in a scrolling manner in a circular endless buffer in which at least three of the icons are displayed on the display. The user interface device also selects one of the navigation and media guide interfaces for one of the different kinds of digital media content and device operations by selecting an associated one of the limited set of icons.

The above summary of the various embodiments of the invention is not intended to describe each illustrated embodiment or every implementation of the invention. The figures in the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
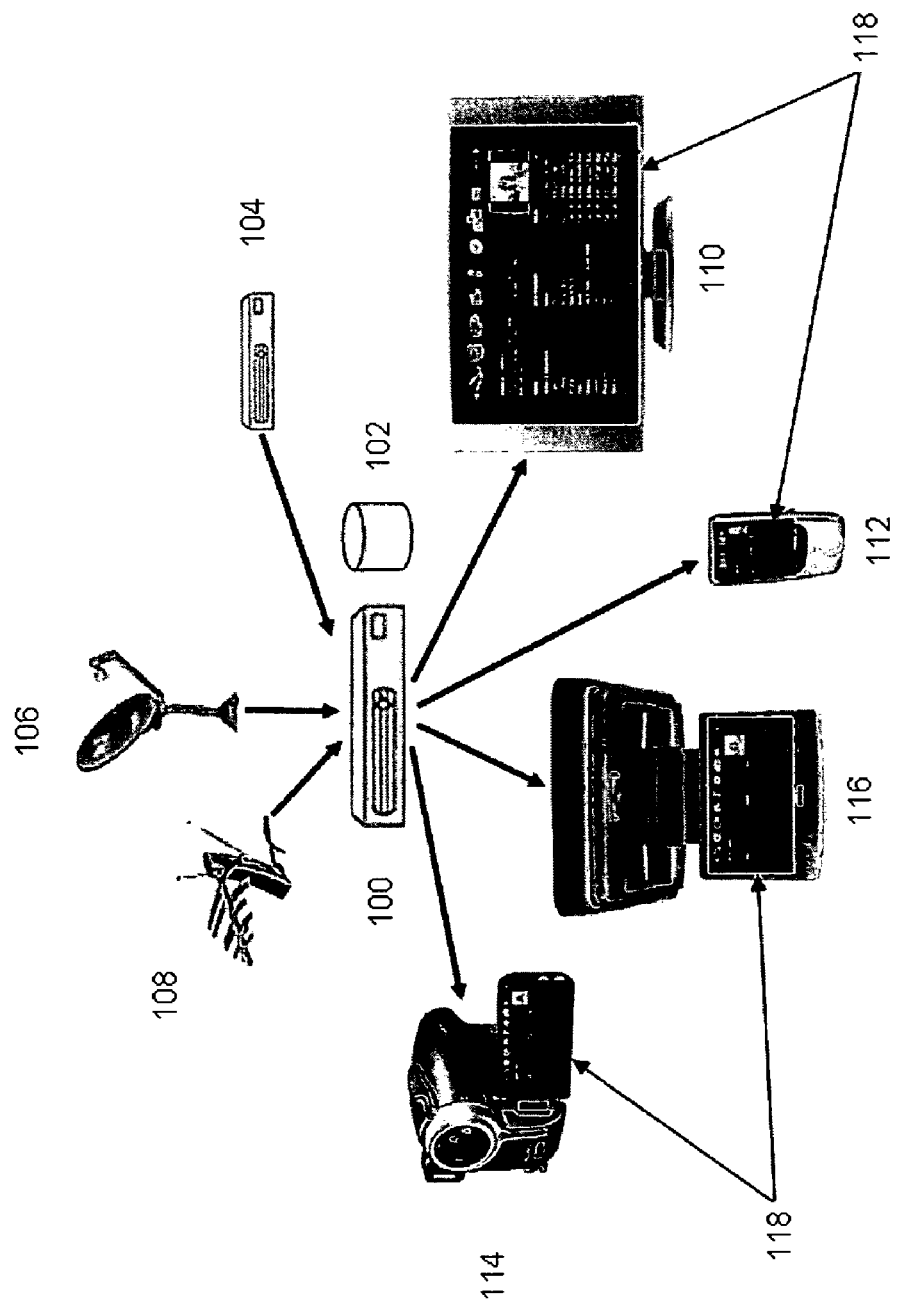
FIG. 1 is a diagram illustrating an overall schematic of a network of heterogeneous media devices.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1 depicts a network of digital media devices, including a central digital media device 100 with stored digital media files 102 in accordance with one embodiment of the present invention. Preferably, central digital media device 100 is a digital entertainment center. Each central digital media device 100 preferably includes at least one input connection to content sources such as cable television 104, satellite television 106 over-the-air television 108, as well as digital media devices such as CD players, DVD players or the like. Each central digital media device 100 also preferably includes output connections to a variety of other digital media devices such as television sets 110, portable media players (PMP) 112, digital cameras 114, automobile media players 116, as well as other digital media devices such as CD players, digital video recorders (DVR), DVD players, and so on. PMPs 112 may include a multitude of digital audio and video devices capable of receiving and playing digital media files 102. Each digital media device connected to the output of central digital media device 100 shares a ubiquitous or common navigation and program guide user interface 118 for navigating and accessing media files 102.

Digital media content files 102 include photos, videos, movies, television shows, music, games, programs and other digital media. While many of the digital media content files 102 will be copyrighted materials generated by third party copyright holders, it will be understood that at least a portion of the digital media content files stored on central digital media device 100 can include home video files, personally composed music files, digital photographs taken by a consumer, or digital files generated by the consumer, for which a consumer will be the copyright owner.

Preferably, central digital media device 100 operates as a digital entertainment center, personal video recorder (PVR), or other set top box device, capable of receiving and storing digital media files 102. Central digital media device 100 may store digital media files 102 on an internal or external hard disk drive, but will have limited operating system access with no browser interface. Central digital media device 100 may be designed to be operated by a consumer from a user interface displayed on a screen of central digital media device 100 or a separate media device. While central digital media device 100 is shown as being a physically separate box, it will be understood that central digital media device 100 may be integrated into the enclosure of a TV display, PMP or integrated into a vehicle.

Central digital media device 100 is preferably provided with multiple content input source connections. In one embodiment, these may include a cable card and digital satellite connections, which provide direct digital input feeds to central digital media device 100, as well as analog inputs that have been digitized by an MPEG 2 encoder, for example. In one embodiment, a DVD drive is integrated into central digital media device 100. Alternatively, other digital media input/output devices such as a CD player, or a HD DVD or Blu-Ray DVD player could be integrated into central digital media device 100. In one embodiment, central digital media device 100 is provided with the capability of ripping recorded digital media files into digital media content from digital media players. In another embodiment, the digital media devices may be permitted to create CSS encrypted files on optical media, for example.

Preferably, central digital media device 100 is provided with digital output connectors in the form of HDDI and DVI connectors. In one embodiment, analog output connections may also be provided. In another embodiment, a fiber optic digital audio output is provided. Central digital media device 100 may also be linked by USB or a local area network (LAN) connection, either wired or wireless, to some media devices in the network such as automobile media player 116 or PMP 112.

In one embodiment, central digital media device 100 and its connected media devices comprise a single family, or brand, of products purchased by a consumer. In another embodiment, central digital media device 100 and linked digital media devices may be produced by more than one manufacturer and include a variety of brands and platforms.

Figure 2:
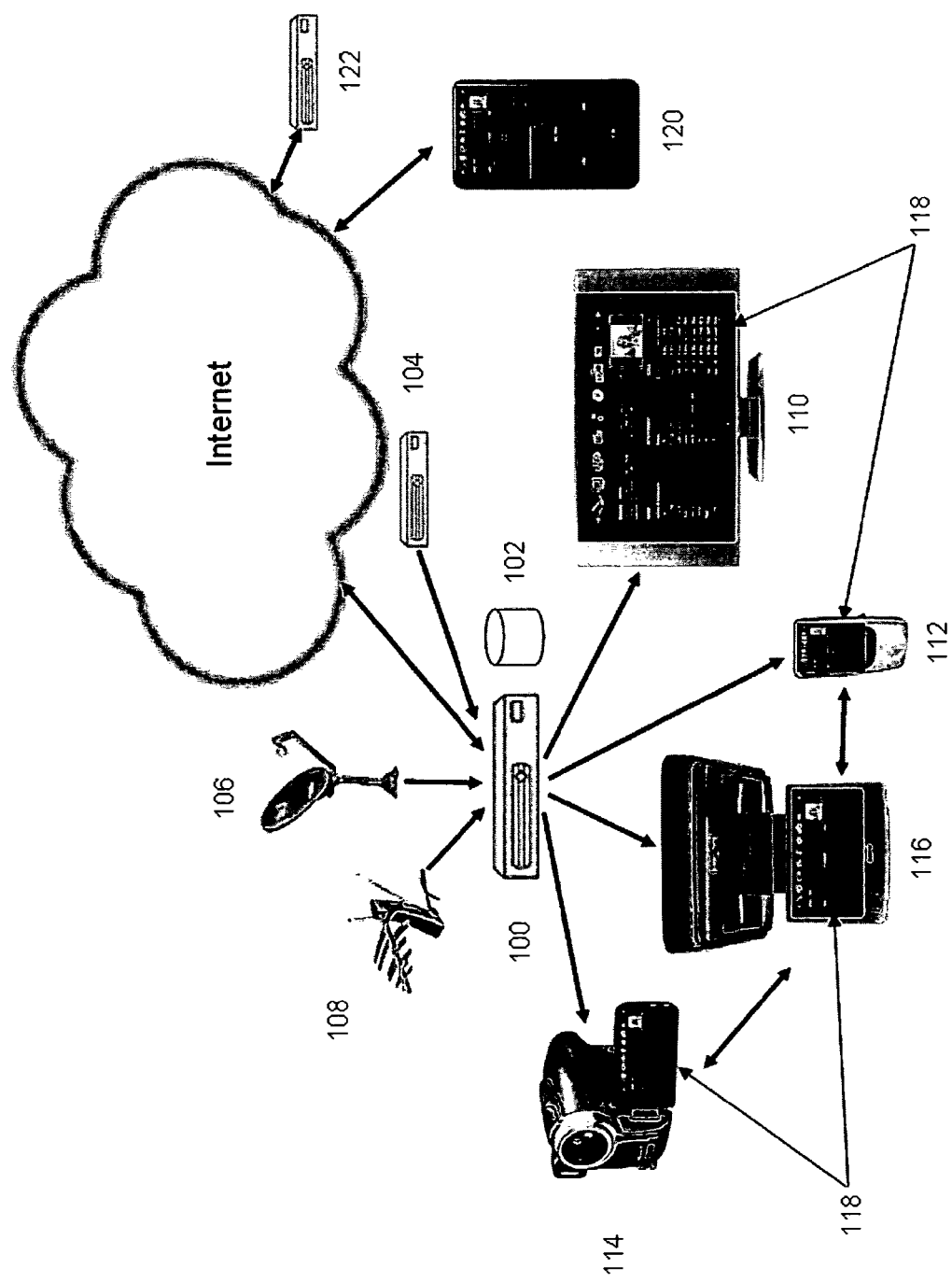
FIG. 2 is a diagram illustrating an overall schematic of a network of heterogeneous media devices with at least one device linked to the Internet and with some devices capable of P2P file sharing.

As depicted in FIG. 2, central digital media device 100 may be connected to the Internet to facilitate connection to additional media devices, for example, digital entertainment center 122 or PMP 120. Internet broadband access is preferably provided via a built-in Ethernet connection. Alternatively, broadband Internet access can be provided through a wireless connection, such as WiFi or WiMAX, or through a power line connection, such as HomePlug®2.0.

As also depicted in FIG. 2, files may also be shared via a P2P connection between media devices, rather than playing or downloading solely from central digital media device 100.

Although the media devices connected to central digital media device 100 represent a variety of technology platforms, media types, and so on, each media device utilizes a common navigation and program guide user interface 118 displayed on a screen to allow a user to access media files 102.

Figure 3A:
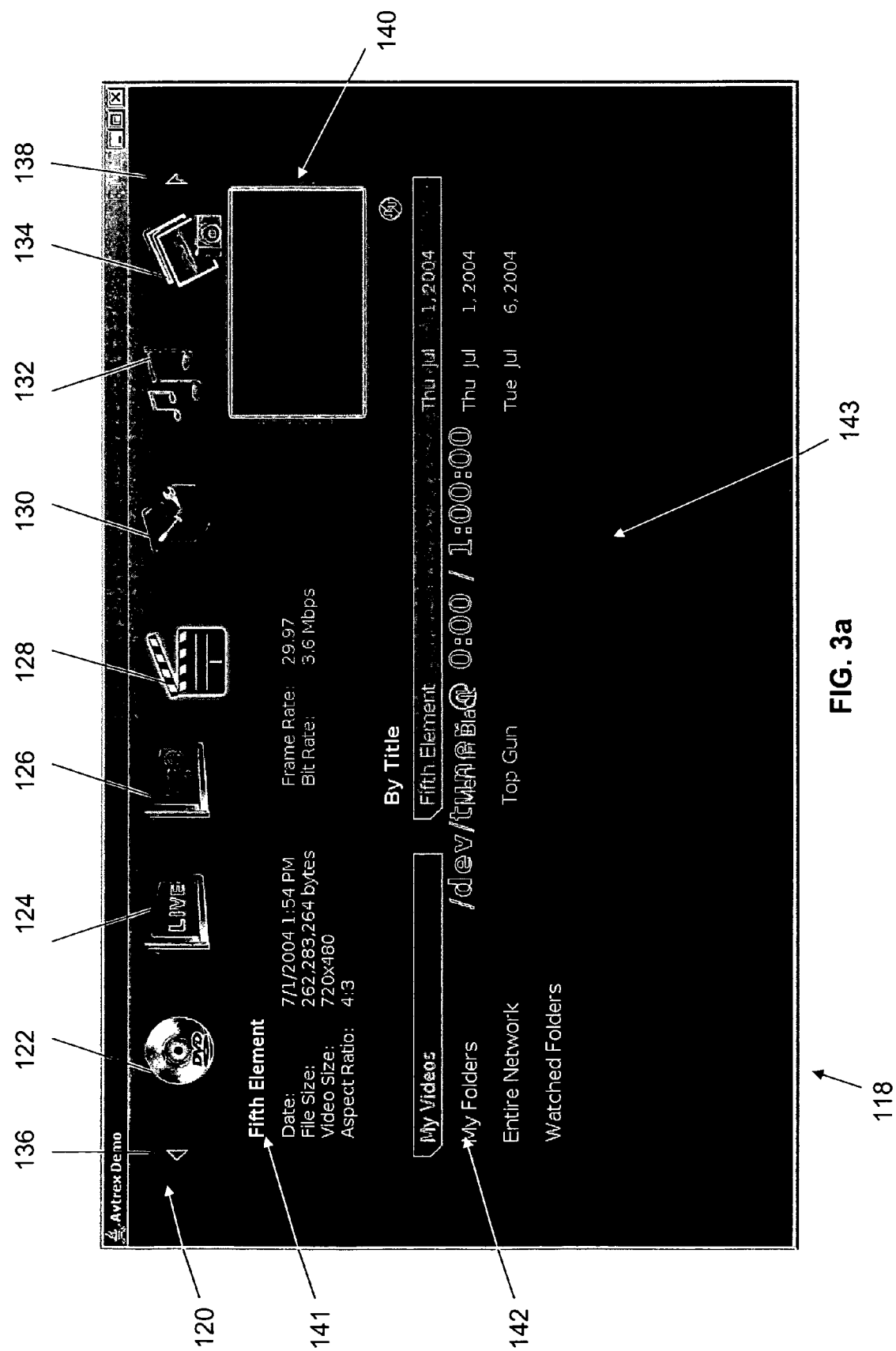
FIG. 3a is a graphical representation of one embodiment of the navigation and program guide user interface of the present invention used to control a central digital media device and connected media devices in accordance with one embodiment of the present invention.

Referring now to FIG. 3a, navigation and program user interface 118 may include a navbar user interface 120, preview window 140, program data display area 141, one or more navigation columns 142, and menu display area 143.

Navbar user interface 120 may be located at an edge portion of a media device screen as part of the displayed navigation and program user interface 118. In one embodiment, navbar user interface 120 may not be displayed when the digital media device is presenting a full screen display of digital media content. Navbar user interface 120 displays multiple graphical media icon images in a scrolling manner in a circular endless buffer. The icons represent various digital media content formats and digital media devices.

In one embodiment, navigation and program guide interface 118 and a navbar user interface 120 may include up to fifteen graphical icon images. However, not all of these icons may be available in the navbar user interface 120 for each media device platform. For any given platform, between three and fifteen graphical icon images may be included in navbar user interface 120. Although the number of icons may vary across platforms, the graphical images of the icons are common across the platforms and the heterogeneous multitude of digital media devices.

For example, the platform of a central digital media device 100 may include the maximum number of icons, while another digital media device with limited media recording and playback capability, such as digital camera 114, for example, may include fewer icons. Although the navbar user interface 120 of an exemplary central media device 100 may present fifteen icons, while digital camera 114 may present only three icons, the icons common to the two devices maintain the same general appearance, scrolling order, and displayed content.

Different platforms of digital media devices will also have displays with different screen sizes. In one embodiment, the different screen sizes, as measured diagonally, range from 2½" to at least 12". Navbar user interface 120 is scaled to a dimension of the edge of the display for the screen size of a given platform of digital media device such that a smaller number of icons may be displayed for a screen size having a smaller edge dimension and a larger number of icons is displayed for a screen size having a larger edge dimension. As part of the scaling of navbar interface 120 the dimensions of the displayed icons may also be scaled. Regardless of the scaling, however, the scrolled order and overall appearance of the icons remains the same.

In the embodiment depicted in FIG. 3a, navigation and program guide user interface 118 is displayed on a screen of one of a group of multiple heterogeneous digital media devices. In this embodiment, navbar user interface 120 is presented at a top edge portion of the screen display. Navbar user interface 120 includes seven media icons, all of which are displayed.

In addition to presenting navbar user interface 120 at a top edge of display, navigation and program guide user interface 118 also presents digital media content, media device information and device operations in a grid format via preview window 140, program data display area 140, navigation column 142, and menu display area 143.

Preview window 140 may provide graphical representations or previews of the particular media file 102 currently selected by the user. For example, when viewing digital photos, a representative photo may appear in preview window 140, or when listening to a music file, a graphic of an album cover may appear in preview window 140. For some media types, navigation and program guide user interface 118 also presents program information in program data display area 141. Navigation columns 142 provides file location information for some media formats or types, and finally, multiple columns, panes, or menus, for navigating and selecting media content are presented in menu display area 143.

Navbar user interface 120 is operated in a circular scrolling manner. Depending on which edge portion and orientation of navbar user interface 120, the scrolling may be done in a left-right or up-down direction. A user may scroll navbar user interface 120 and select a media icon, navigation column 142, menu, or presented information in a number of different ways. In one embodiment, arrow keys on a keyboard may be used to navigate or scroll across the various media icons of navbar user interface 120. In another embodiment, a touch screen may be used. In yet another embodiment, buttons, particularly left, right, up, and down "arrow" buttons of a remote control are used to navigate navbar user interface 120 and the presented media information of navigation and program guide user interface 118. Buttons or keys such as "enter" and "escape" may also be used to make an icon, column or menu selection.

The method of selecting a given media type depends on the particular media device in use. In the embodiment described herein, it will be assumed that a user is navigating the navigation and program guide user interface 120 using the arrow buttons on a remote control. As such, the terms right, left, up, and down will be used to refer to a user selecting icons, titles, or other menu options that appear to the right, left, top, or bottom portion of navigation and program guide user interface 120 as viewed by a user of the media device.

Still referring to the embodiment depicted in FIG. 3a, navbar user interface 120 includes seven icons: a DVD icon 122, live television icon 124, program record icon 126, video icon 128, tools icon 130, music icon 132, and photo icon 134. In other embodiments, additional icons representing other media content formats or devices, may be presented in navbar user interface 120. Additional icons may include recorded video, personal video, recorded television, CD player, device operation, device information, and other icon specific to a media content format or media device. To select the media type or device desired, a user selects or highlights the desired icon by scrolling navbar user interface 120, and information relating to the particular type of stored media files 102 is displayed. When a media icon is selected, the icon may be presented in the central portion of navbar user interface 120, with a slightly altered appearance. In other embodiments, scrolling navbar user interface 120 may not cause the icon to be presented in a central portion of navbar user interface 120.

Video icon 128 is selected by scrolling navbar user interface 120. Video icon 128 appears in the central portion of navbar user interface 120, with three icons to the left, and three icons to the right. In this embodiment, yellow shading appears around the border of video icon 128 indicating that it is selected.

Program file data regarding the first video title appears as a default in program display area 141, directly below navbar user interface 120. For video files, the date, file size, video size, aspect ratio, frame rate, and bit rate may be presented for the viewer's convenience.

In this particular example, preview window 140 does not present a graphic, though it may for some video program files.

Below navbar user interface 120 and the program data display area 141, a navigation column 142 is presented on the left side of navigation and program guide user interface 118. In this embodiment, navigation column 142 presents four locations where video files are found: "My Videos," "My Folders," "Entire Network," and "Watched Folders." Each location is a selectable menu choice, and a file location is selected by scrolling up and down the menu choices, highlighting the desired location. The number of navigation columns 142 and locations appearing depends on the particular media device being used, the network, and system configuration.

Figure 3B:
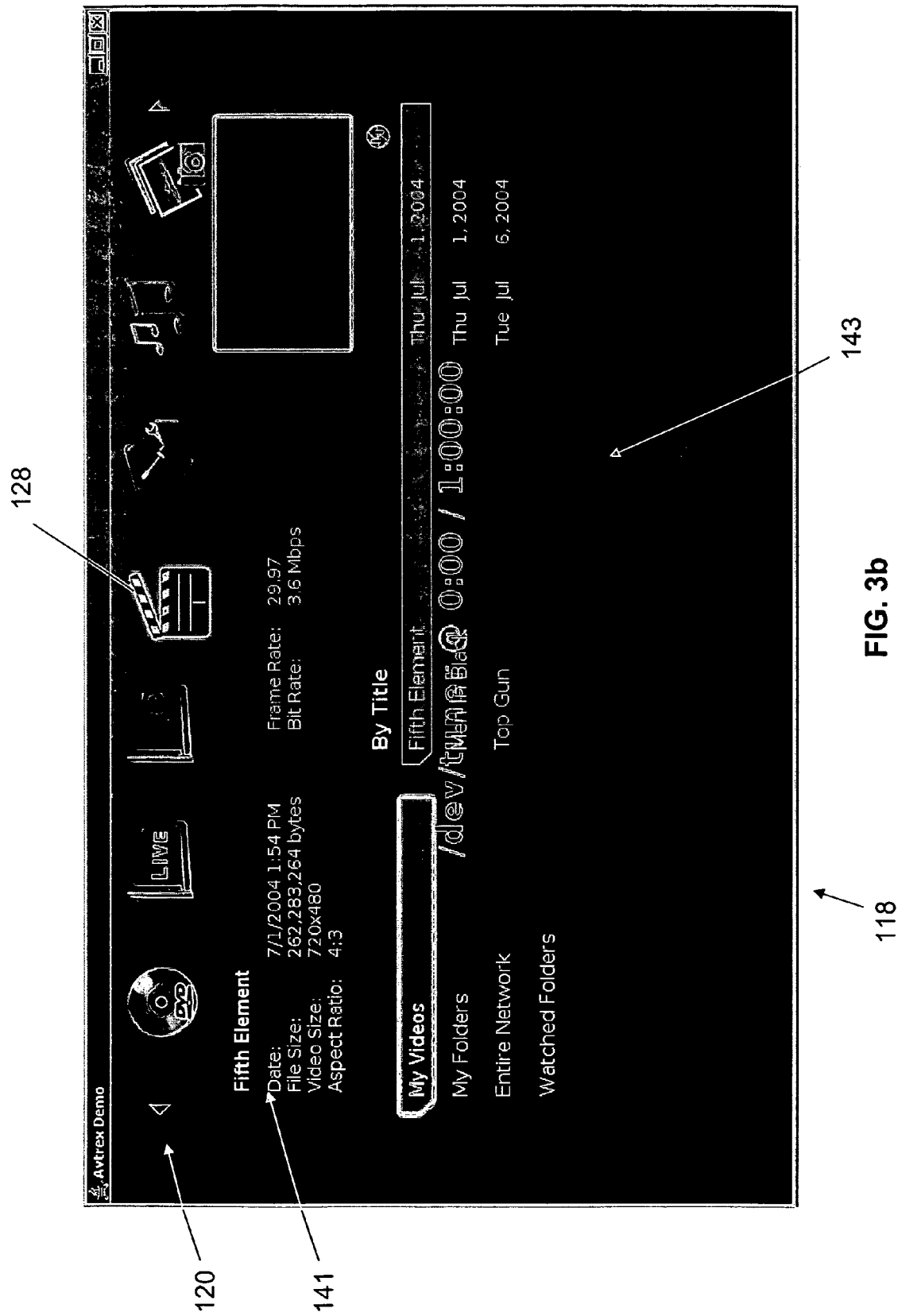
FIG. 3b is a graphical representation of the navigation and program guide user interface of the present invention where a video icon is selected.

In the embodiment depicted in FIG. 3b, video icon 128 is now depicted with a light blue border indicating that a user is navigating navigation column 142 or menu display area 143. In this example, the location "My Videos" has been selected from navigation column 142. Corresponding video files listed by title and date appear to the right of navigation column 142 in menu display area 143. In this example, movie titles: "Fifth Element," "Men In Black," and "Top Gun", appear as a column of menu choices in menu display area 143.

Figure 3C:
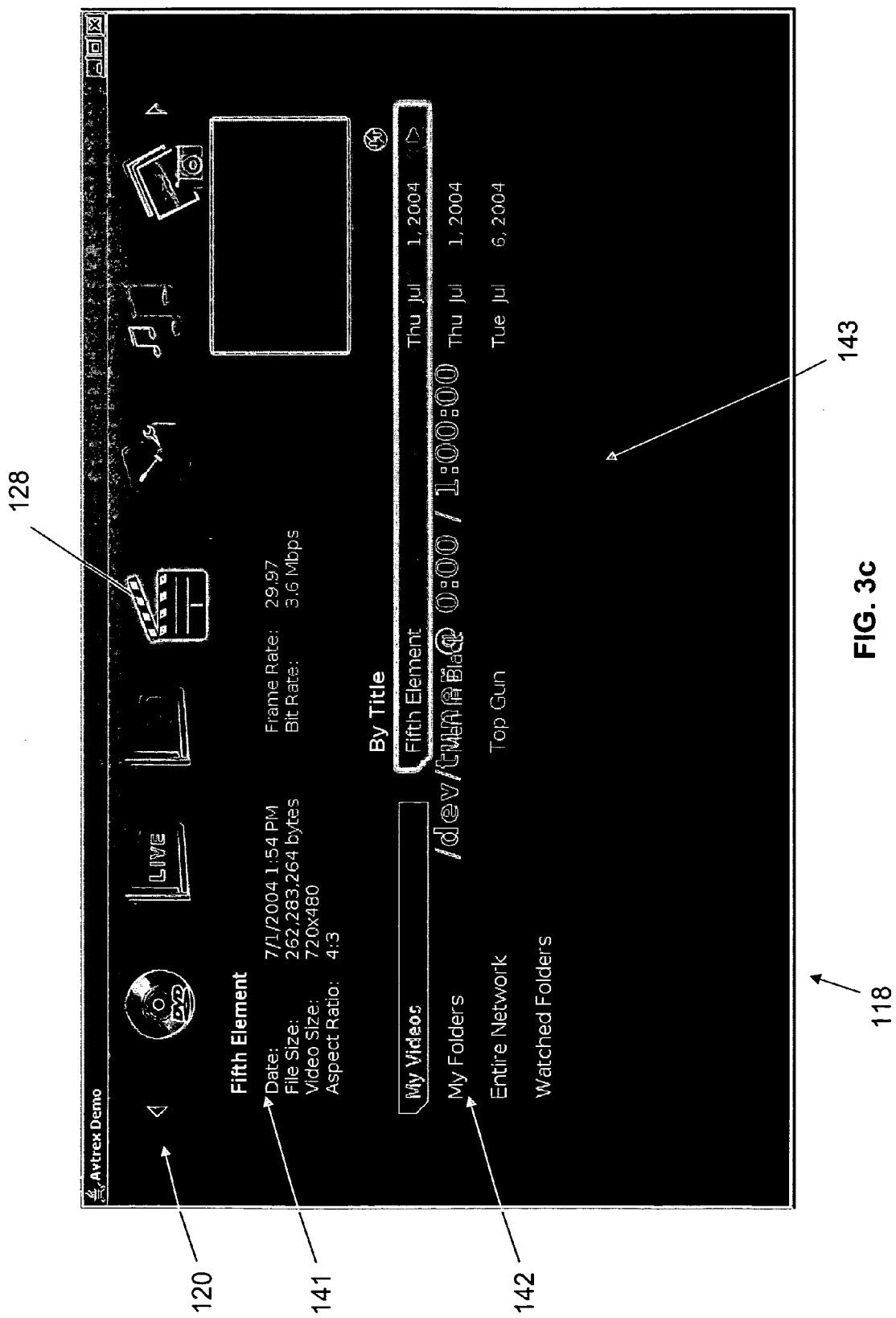
FIG. 3c is a graphical representation of the navigation and program guide user interface of the present invention where a video icon is selected and a video menu by title is displayed.
Figure 3D:
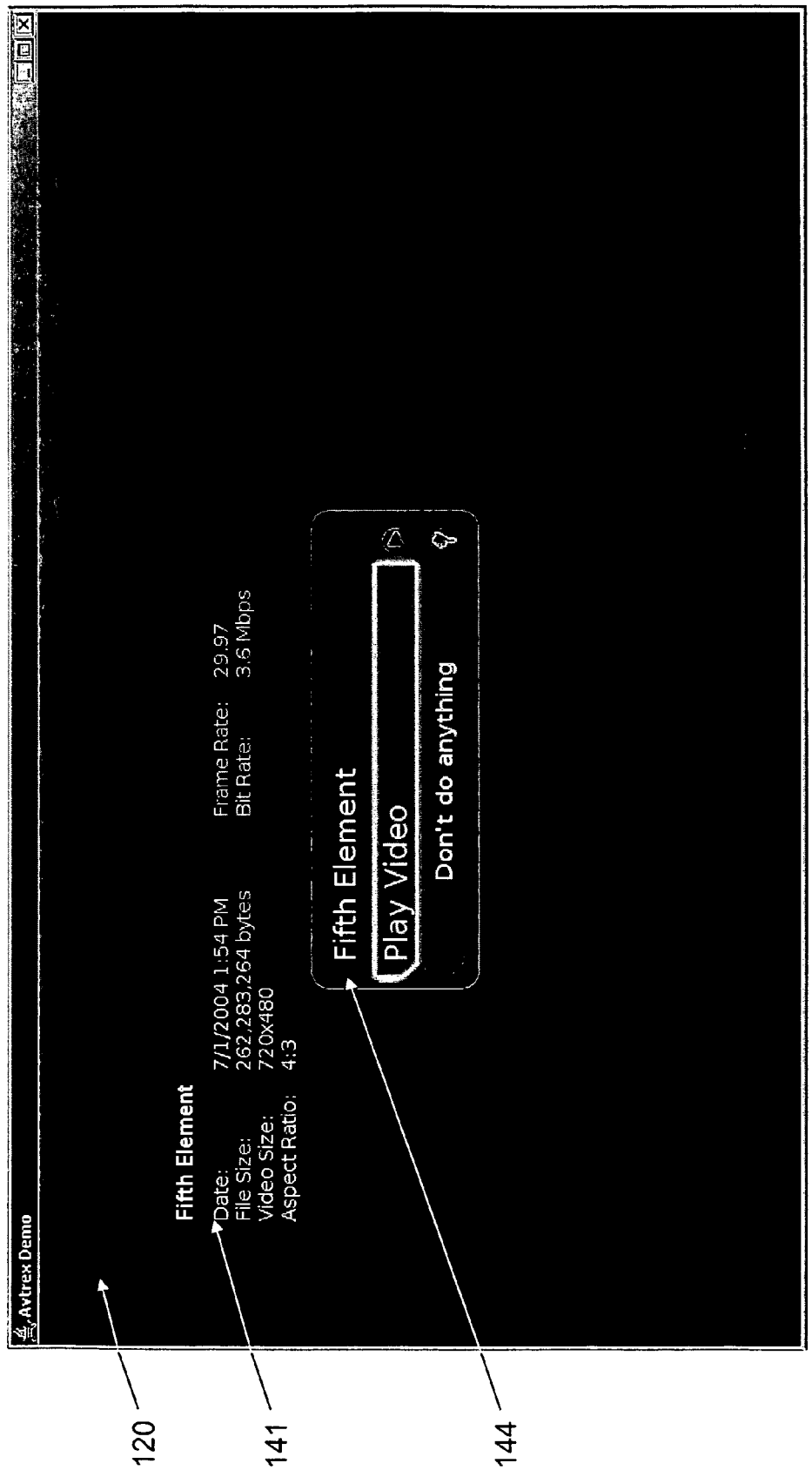
FIG. 3d is a graphical representation of a play menu of the navigation and program guide user interface of the present invention where a video icon is selected from a navbar user interface.

In FIG. 3c, the media file entitled "Fifth Element" is selected as seen by a colored background and white border surrounding the menu choice. Information regarding the selected media file appears in program data display 141. In some embodiments, a graphic appears in preview window 140. If a user selects this video file, while the media file is highlighted as a menu choice, a play menu 144 is presented as shown in FIG. 3d. Program data remains in program display area 141, while navbar user interface 120 is darkened to indicate its unavailability. At this point, a user may either select "Play Video" or "Don't do anything." If "Play Video" is selected, the selected video file is opened by the media device and appears on the media device screen. In the embodiments of FIGS. 3a-d, neither navbar user interface 120 nor menus are displayed while the device is operated in full-screen mode. In other embodiments, navbar user interface 120 may remain on navigation and program guide user interface 118 while video images are presented on the device screen.

Figure 3E:
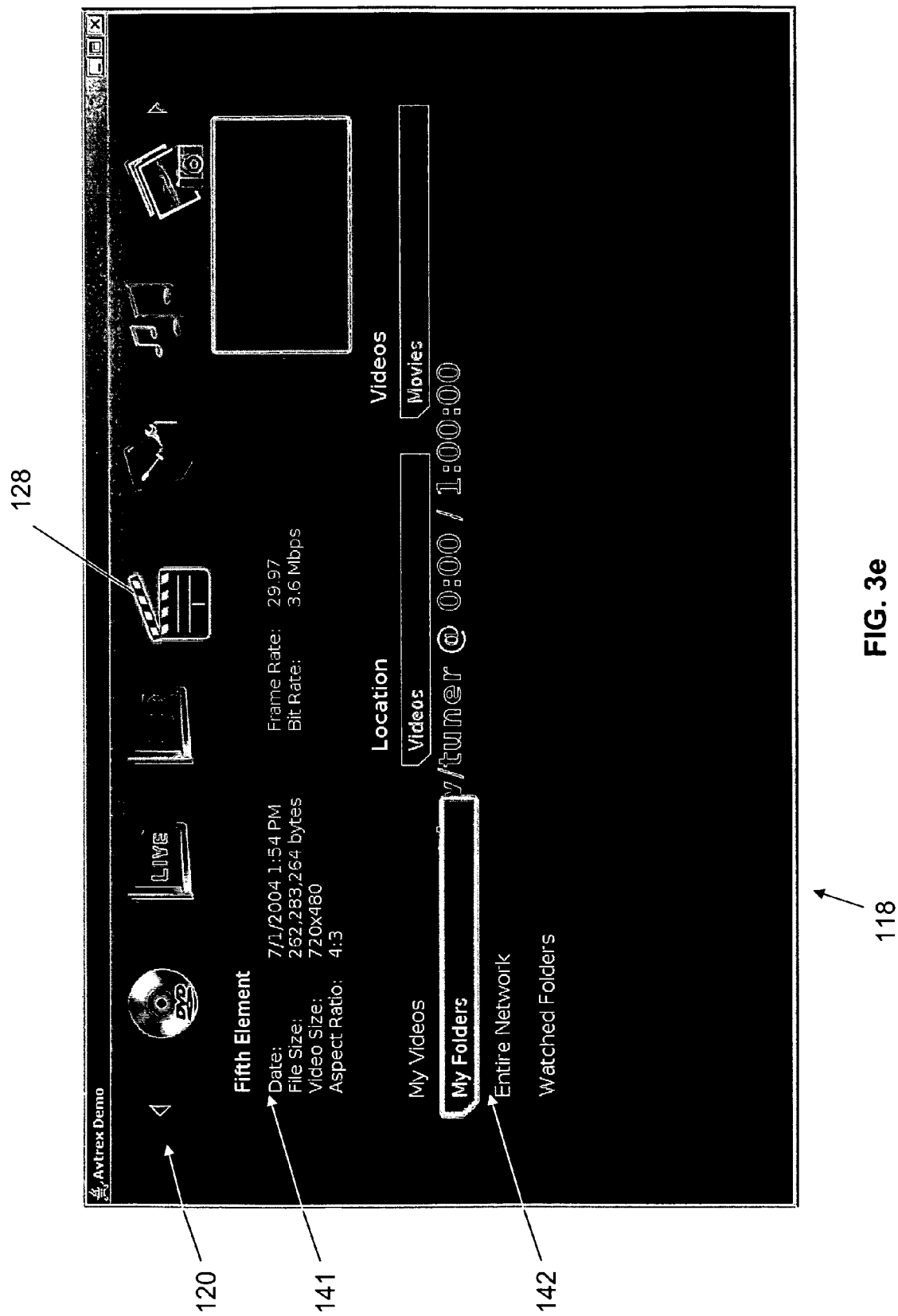
FIG. 3e is a graphical representation of the navigation and program guide user interface of the present invention where video icon is selected and a location "My Folders" is selected from a navigation column.
Figure 3F:
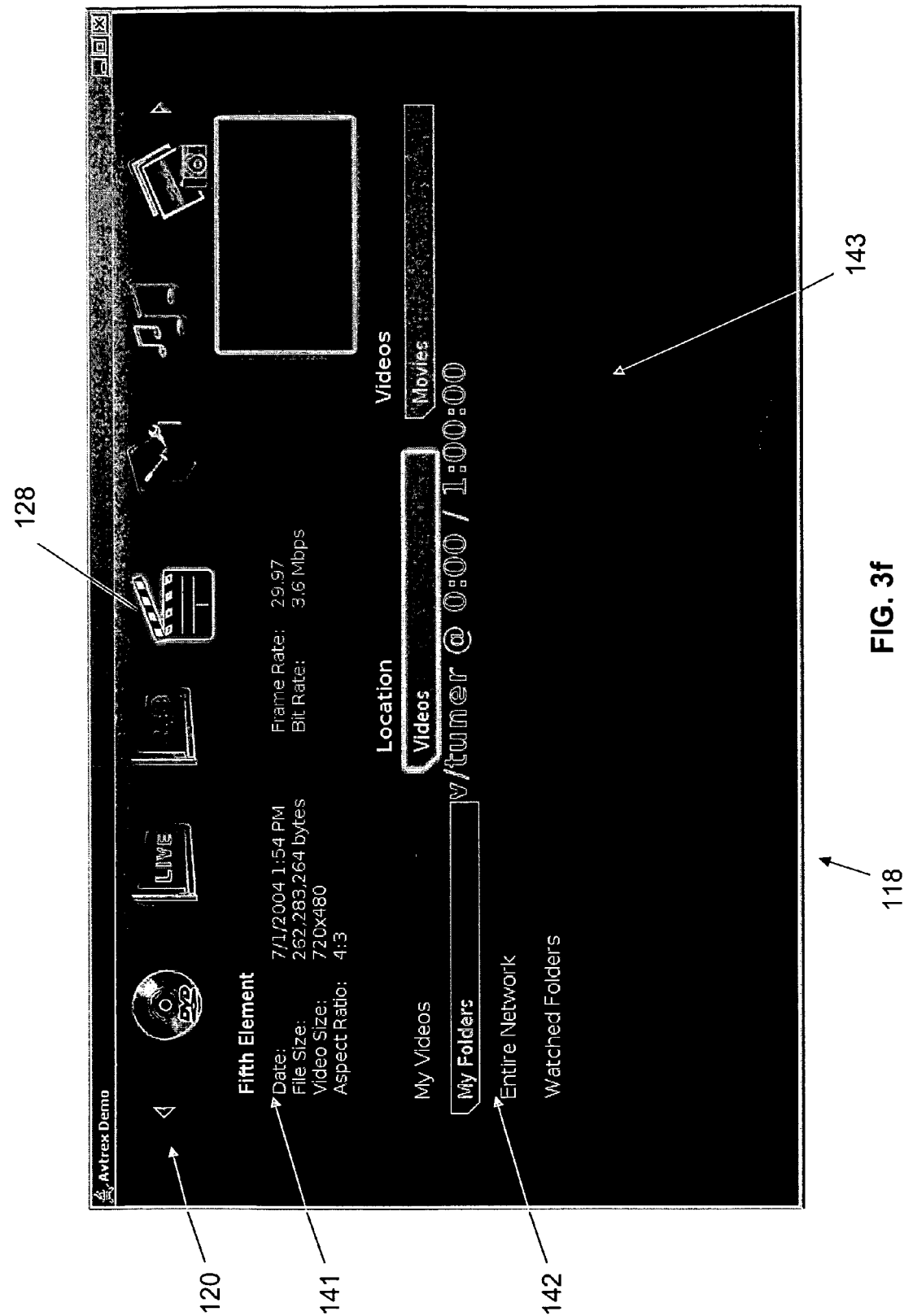
FIG. 3f is a graphical representation of a navigation and program guide user interface of the present invention where a video icon is selected and location "Videos" is selected.
Figure 3G:
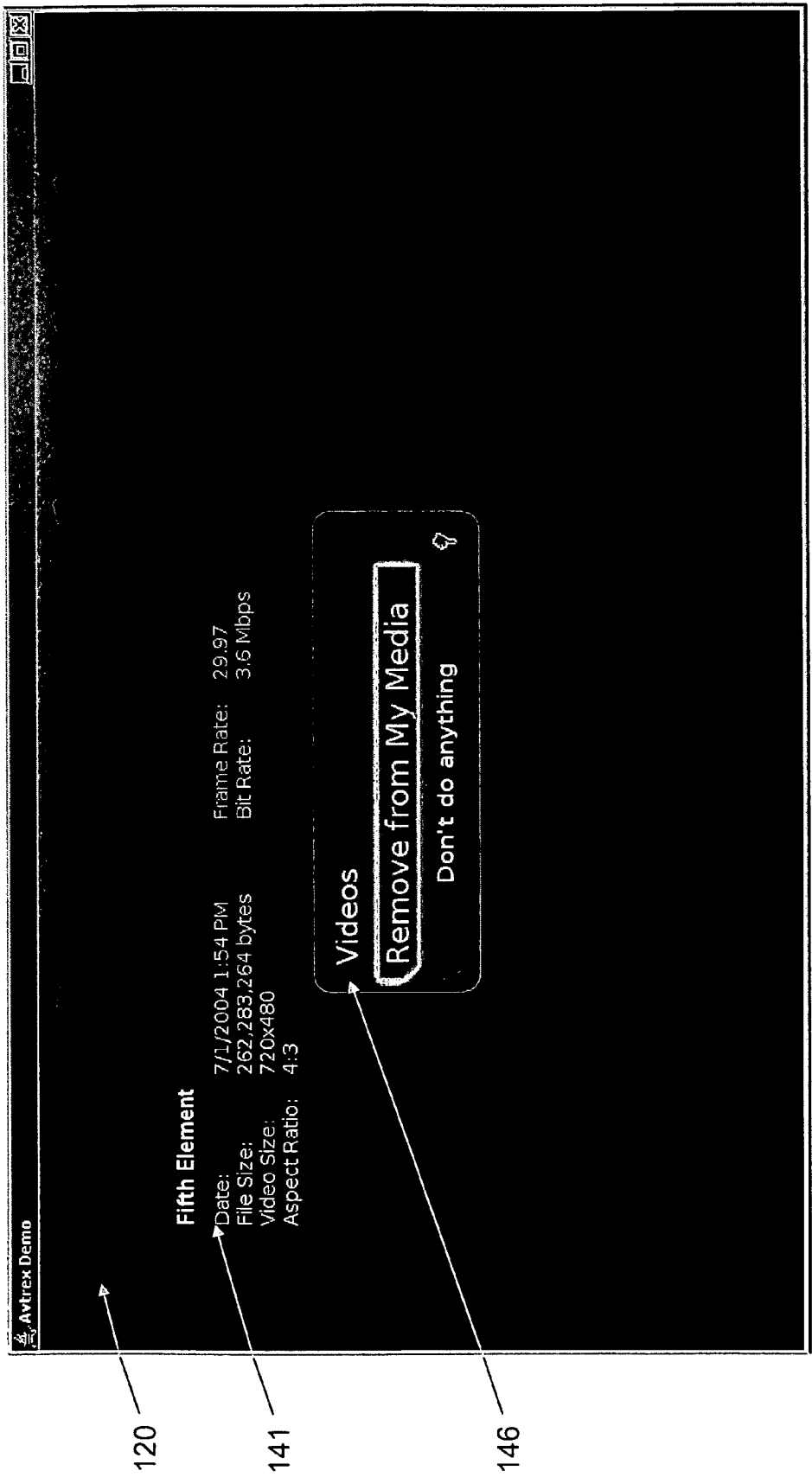
FIG. 3g is a graphical representation of a "Remove" menu of the navigation and program guide user interface of the present invention where a video icon has been selected.

Referring now to FIG. 3e, media file location "My Folders" is selected. Sub-folder "Location" appears adjacent to the primary "My Folders" location as a menu choice in menu display area 143. Sub-folder "Videos" appears as adjacent to menu choice "Videos." When "Videos" is selected as shown in FIG. 3f, an additional remove menu 146 appears as depicted in FIG. 3g.

In similar fashion, menu choice locations "Entire Network" or "Watched Files," may be selected and a host of associated menu choices become available.

The navigation panes and menu choices presented in the example shown in FIGS. 3a to 3g are not meant to represent an exhaustive list of all available choices. Other choices or options may be presented to accommodate the particular type of media device used or media format viewed.

Figure 4A:
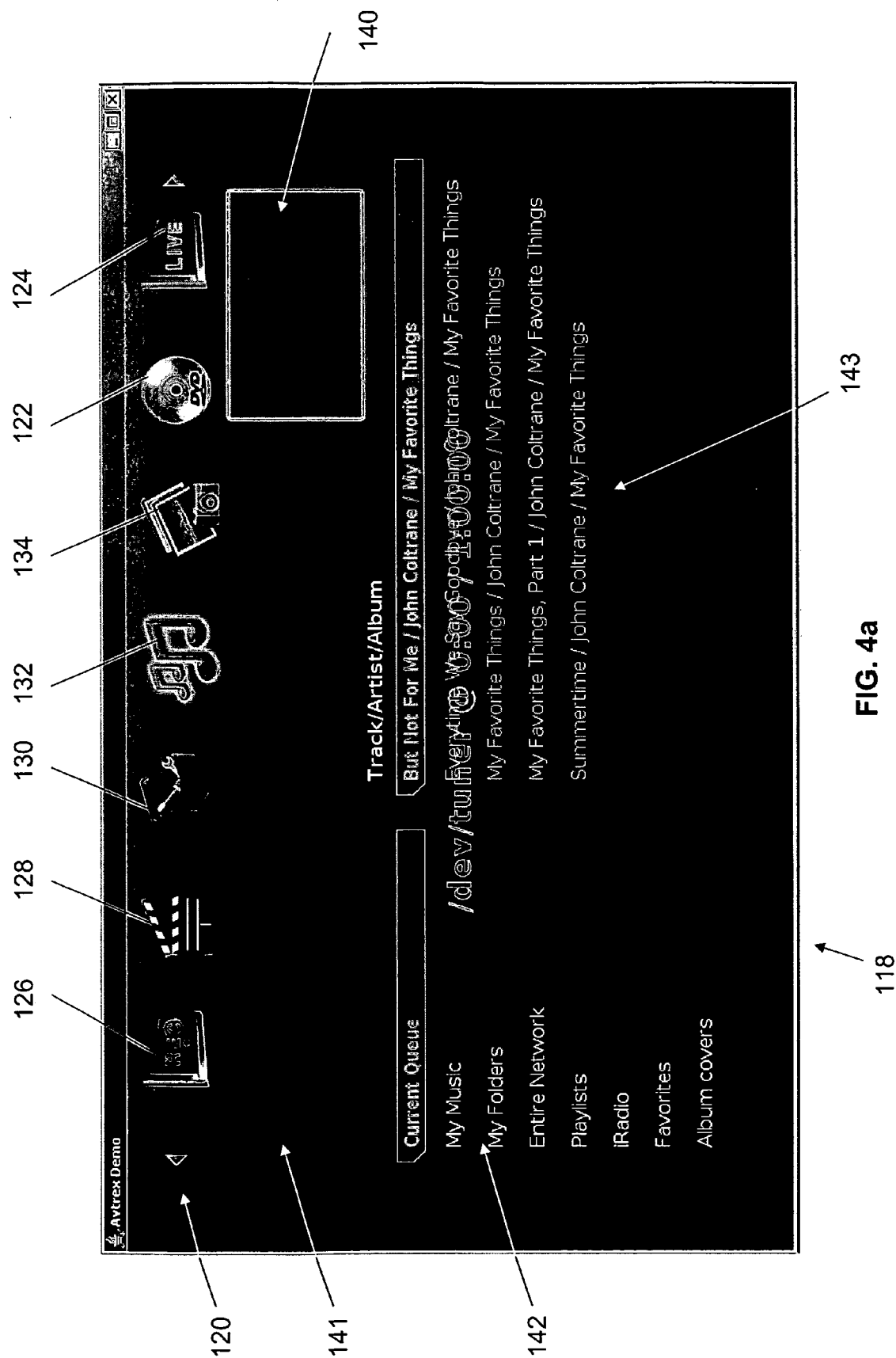
FIG. 4a is a graphical representation of one embodiment of the navigation and program guide user interface of the present invention, where a music icon is selected from a navbar user interface.

Referring now to FIG. 4a, music icon 132 is selected and is now located in the center of navbar user interface 120. In this embodiment, no graphic appears in preview window 140, nor does program data appear in program data display area 141, until a file location or music file has been selected. In other embodiments, file data and a graphic from a recently opened file or other music file may be presented as a default.

Figure 4B:
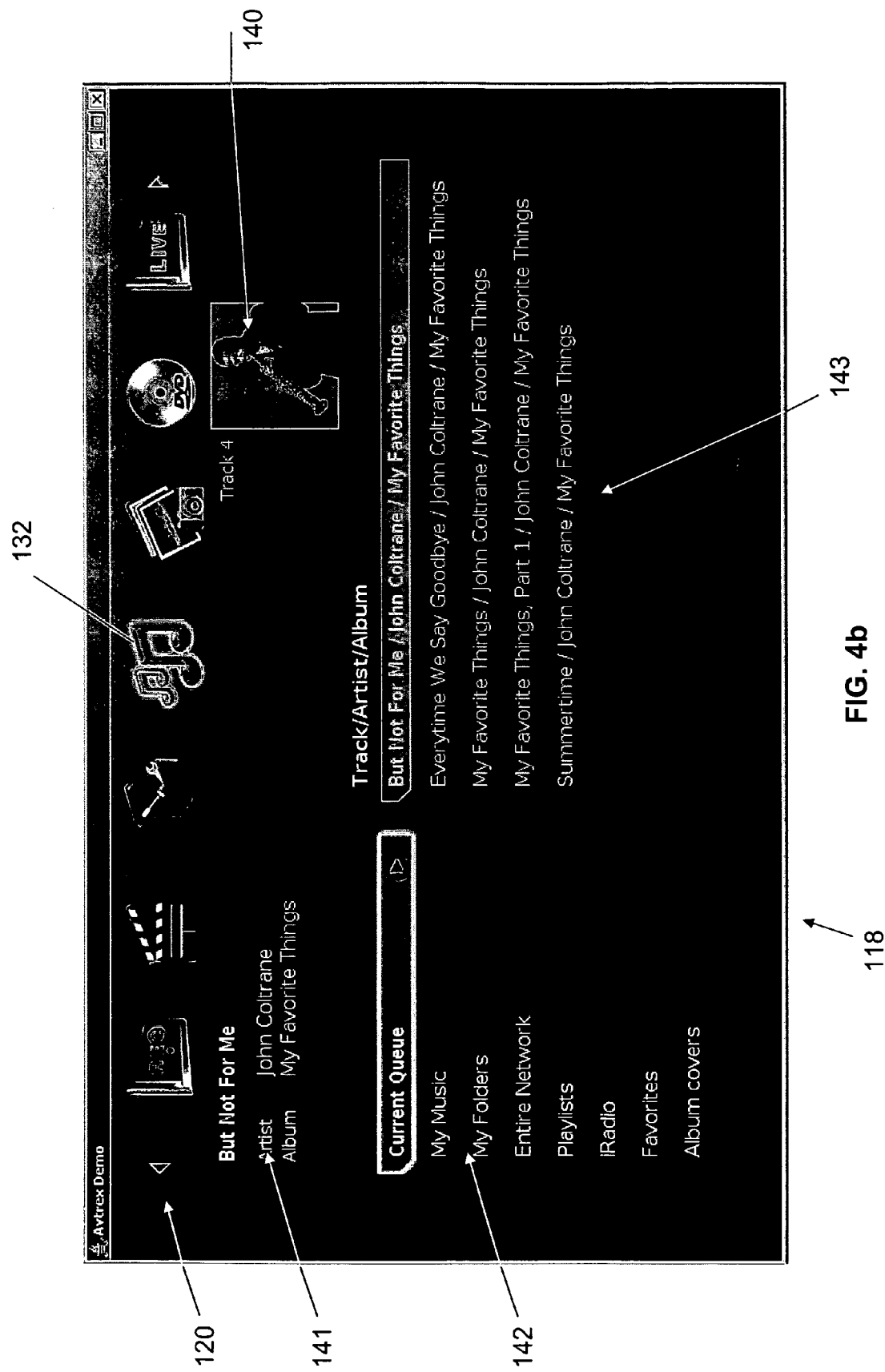
FIG. 4b is a graphical representation of the navigation and program guide user interface of the present invention, where a music icon is selected and the location "Current Queue" is selected from a navigation column.

Referring now to FIG. 4b, a menu of available music file storage locations appears in navigation column 142. Locations presented include: "Current Queue," "My Folders," "Entire Network," "Playlists," "iRadio," "Favorites," and "Album Covers." "Current Queue" is selected from navigation column 142, and a menu or navigation column "Track/Artist/Album" displays a selectable list of the music file titles queued up to play. In this embodiment, displayed title information includes track title, artist, and album name. At the same time, a graphic of the album cover is displayed in preview window 140. Program data, namely artist and album, appears in program data display area 141. Each music file is a selectable menu choice that may be played by the media device currently in use.

Selecting different locations from navigation column 142 causes different menu and navigation columns to appear in menu display area 143. For example, location "My Music" is selected from navigation column 142 as depicted in FIG. 4c.

Figure 4C:
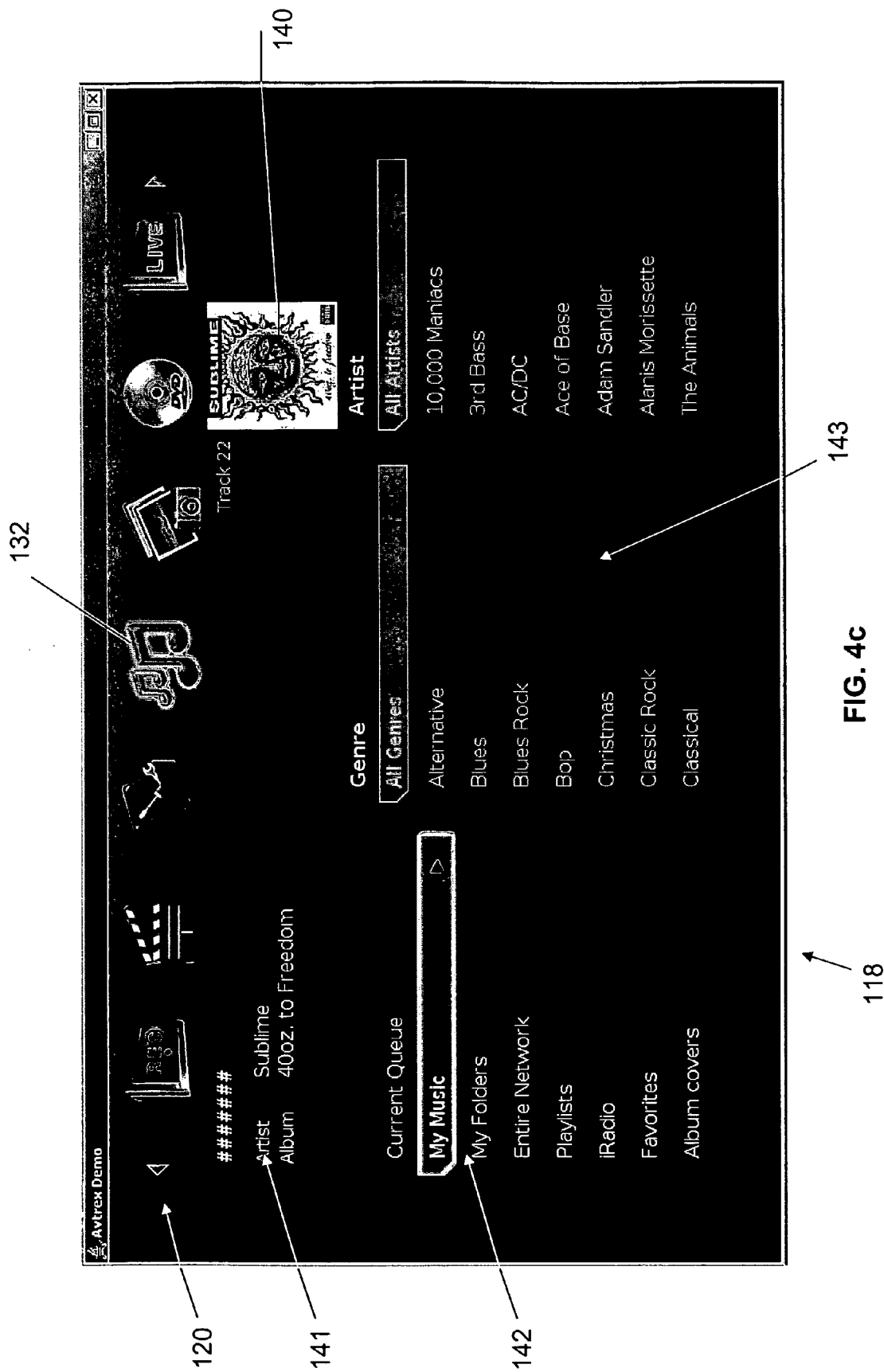
FIG. 4c is a graphical representation of the navigation and program guide user interface of the present invention, where a music icon is selected from a navbar user interface and a location "My Music" is selected from a navigation column.
Figure 4D:
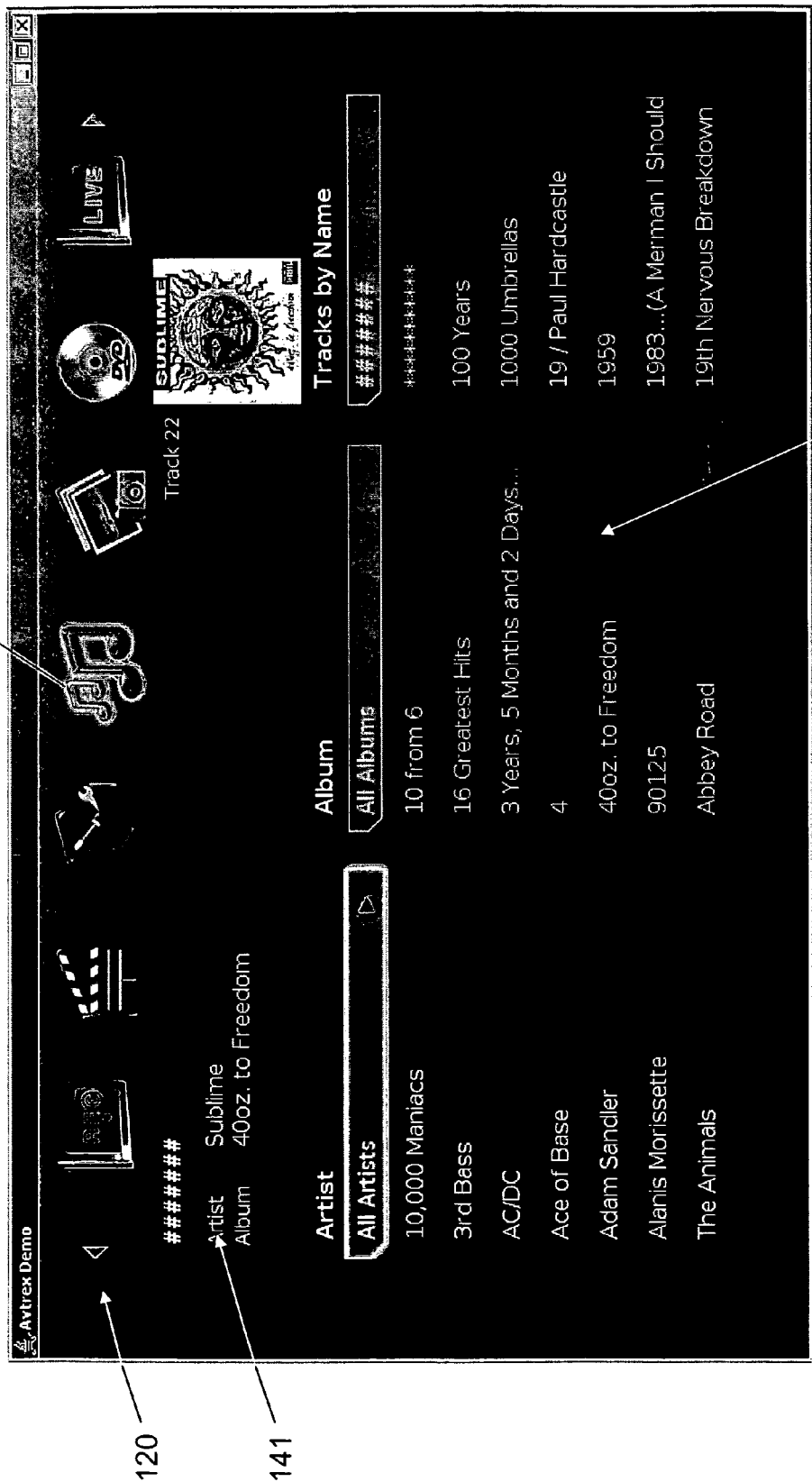
FIG. 4d is a graphical representation of the navigation and program guide user interface of the present invention depicting several music menu choices.
Figure 4E:
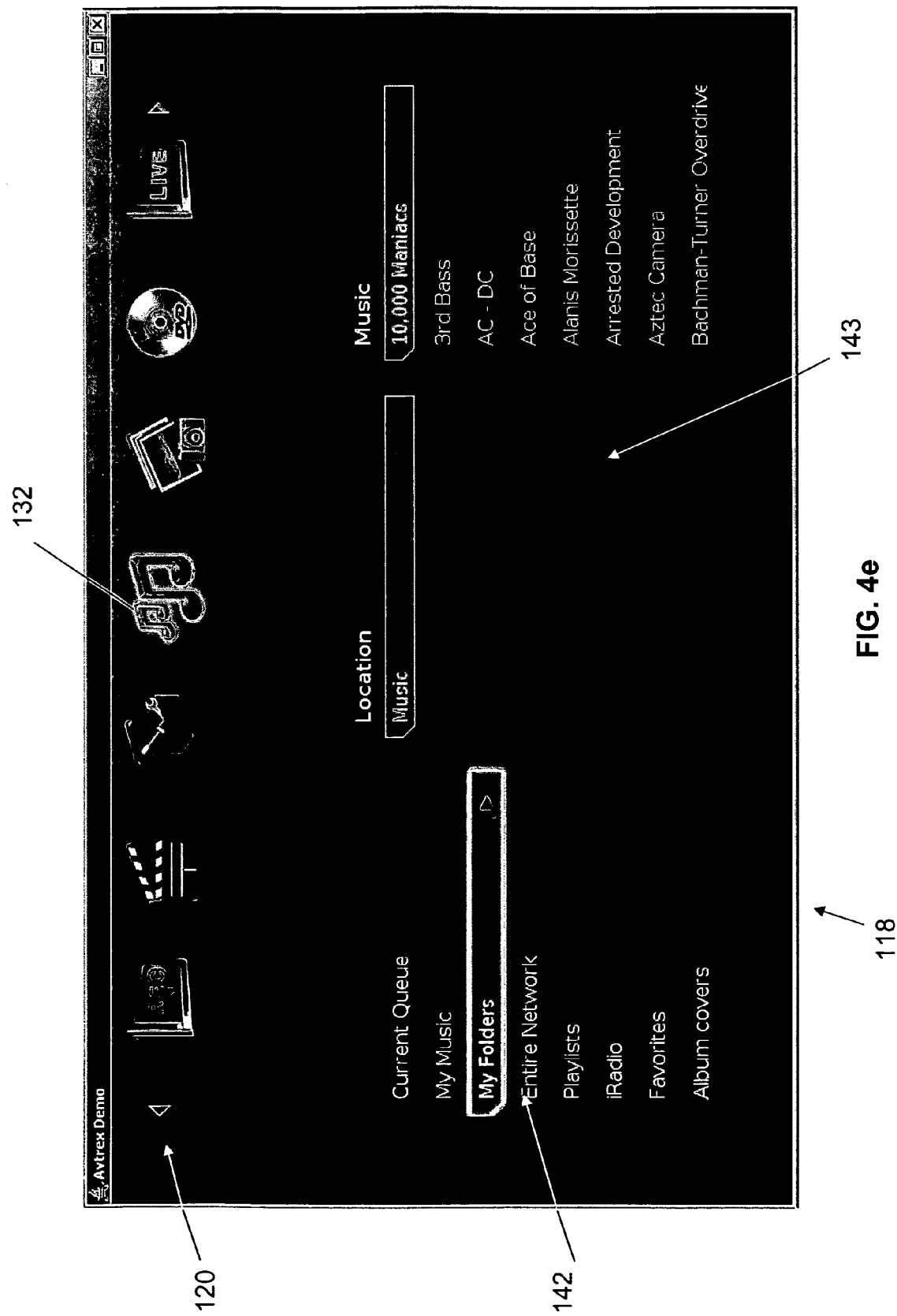
FIG. 4e is a graphical representation of the navigation and program guide user interface of the present invention where a music icon is selected from a navbar user interface and a location "My Folders" is selected.

Selecting "My Music" results in the presentation of the "Genre," "Artist," "Album," and the "Tracks by Name" menu columns in menu display area 143 as depicted in FIGS. 4c through 4e. Selecting an artist from the "Artist" menu displays that artist's album and tracks available as media files to the media device. Similarly, other menu choices may be selected by the viewer to view information about a music file and to play the various available files.

Figure 4F:
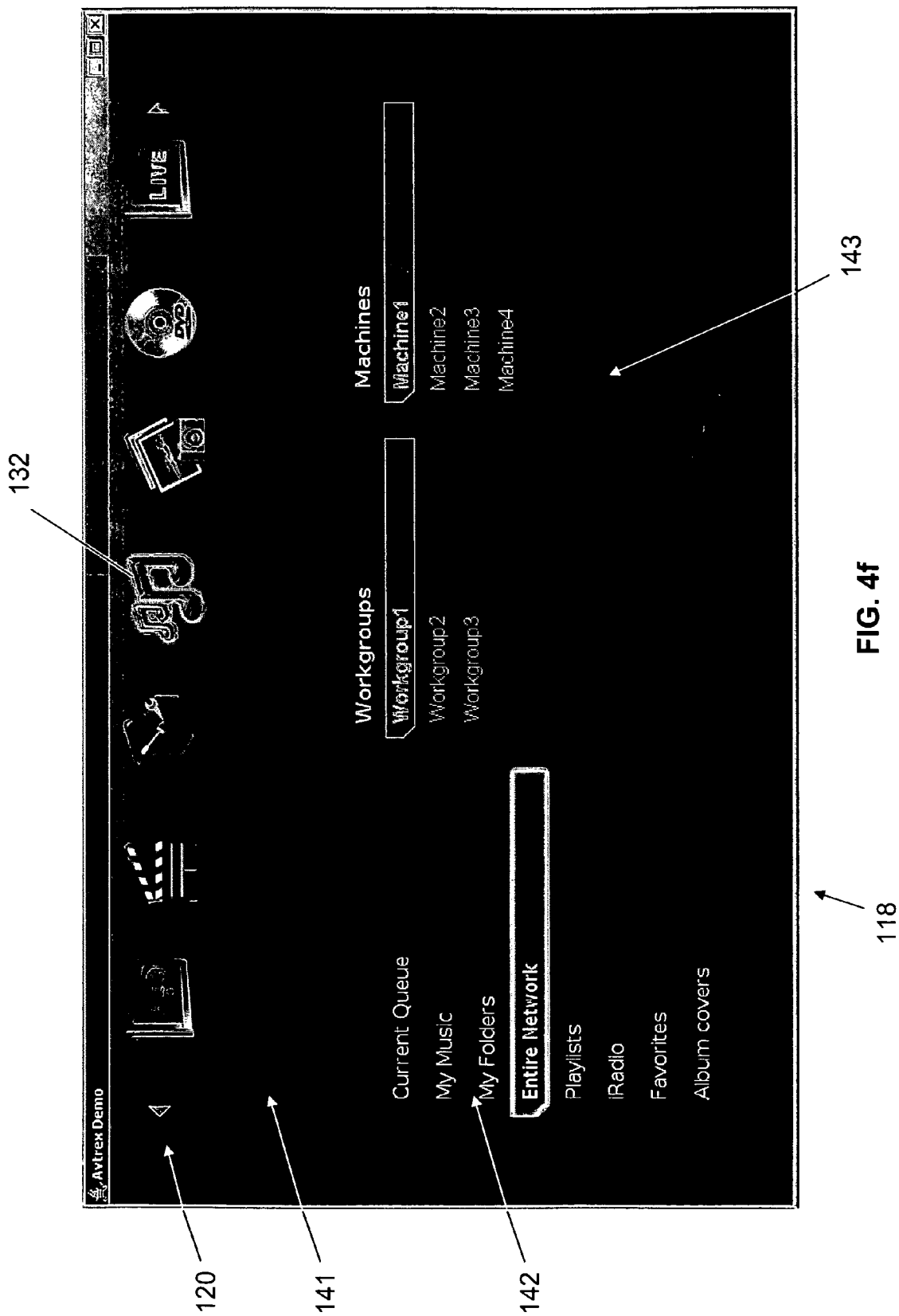
FIG. 4f is a graphical representation of the navigation and program guide user interface of the present invention where a music icon is selected from a navbar user interface and a location "Entire Network" is selected.

Referring now to FIG. 4f, media files 102 may be located or stored at other media storage locations other than the local hard disk drive of the media device currently in use. For example, the location "Entire Network" presented in FIG. 4f, navigation column 142, links a user to files located elsewhere in the network such as the network described in FIGS. 1 and 2. Menu columns "Workgroups" and "Machines" are presented in menu display area 143, offering access to media files 102 located on these networked devices.

Figure 4G:
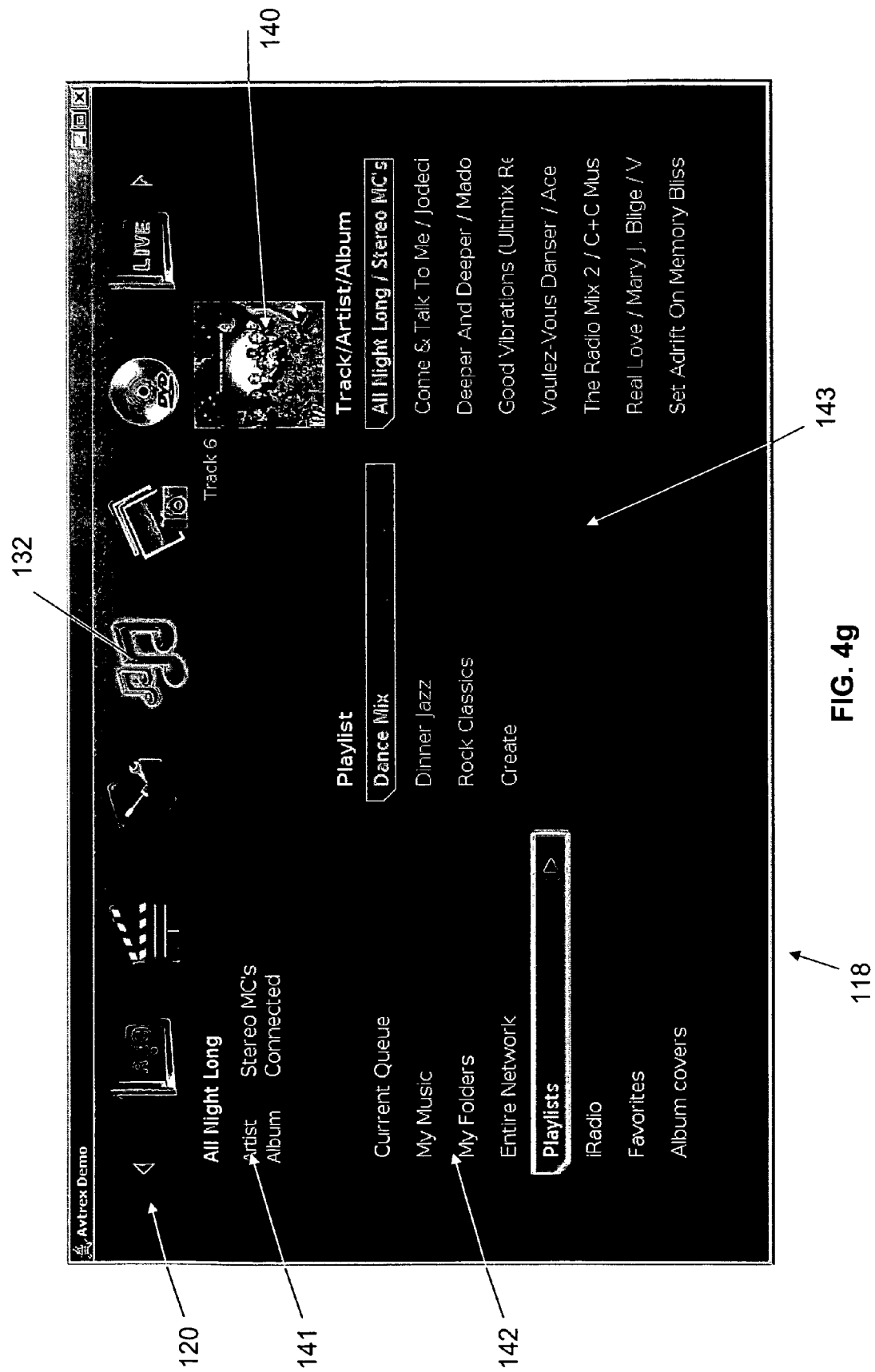
FIG. 4g is a graphical representation of the navigation and program guide user interface of the present invention where a music icon is selected from a navbar user interface and a location "Playlists" has been selected.
Figure 4H:
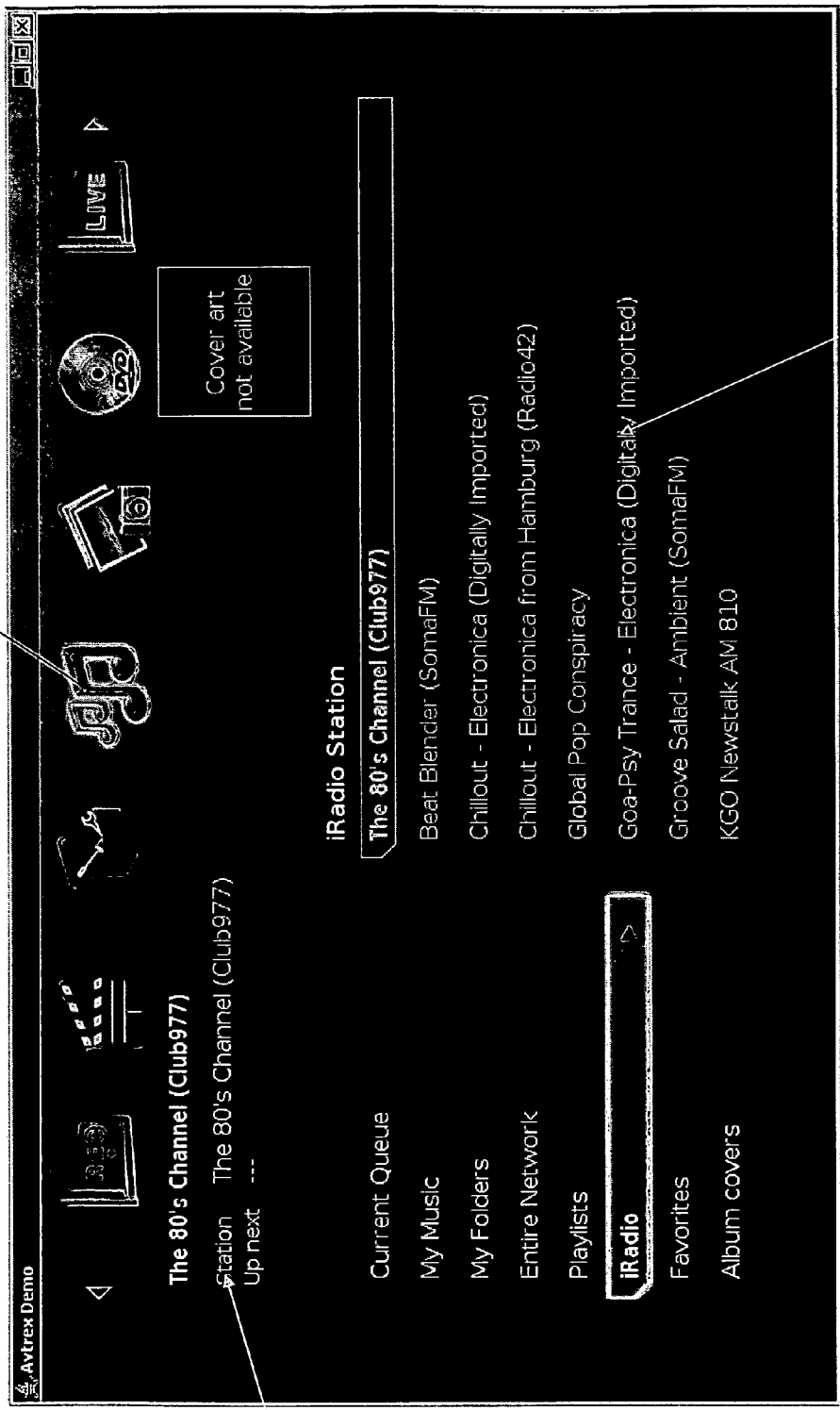
FIG. 4h is a graphical representation of the navigation and program guide user interface of the present invention where a music icon is selected from a navbar user interface and a location "iRadio" is selected.

Similarly as depicted in FIG. 4h, some media files 102 may be "located" on the Internet. In this embodiment, an Internet radio station play list is presented in menu form in menu display area 143. Radio programs may be selected from the menu for user listening.

Figure 4I:
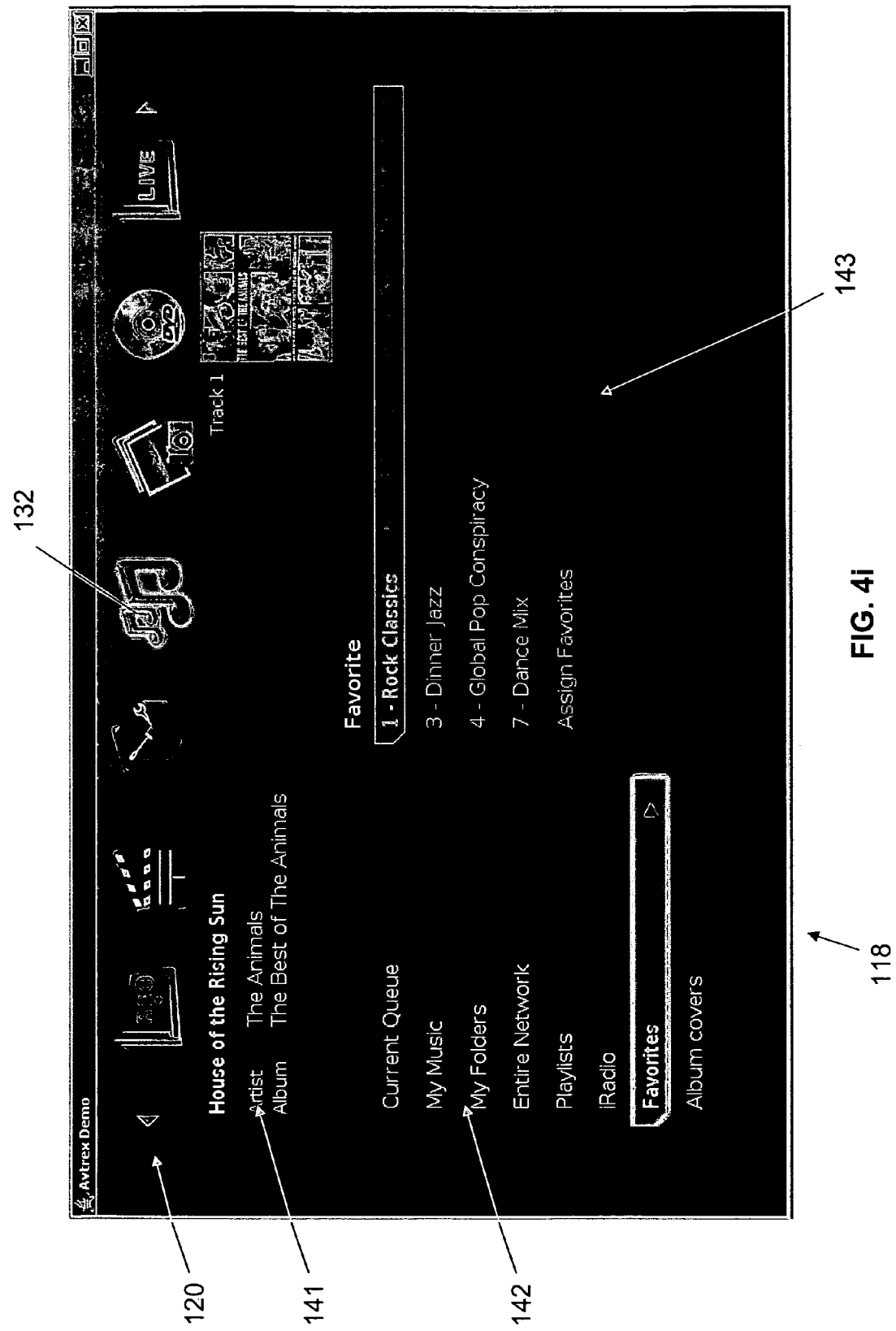
FIG. 4i is a graphical representation of the navigation and program guide user interface of the present invention where a music icon is selected from a navbar user interface and a location "Favorites" is selected.
Figure 4J:
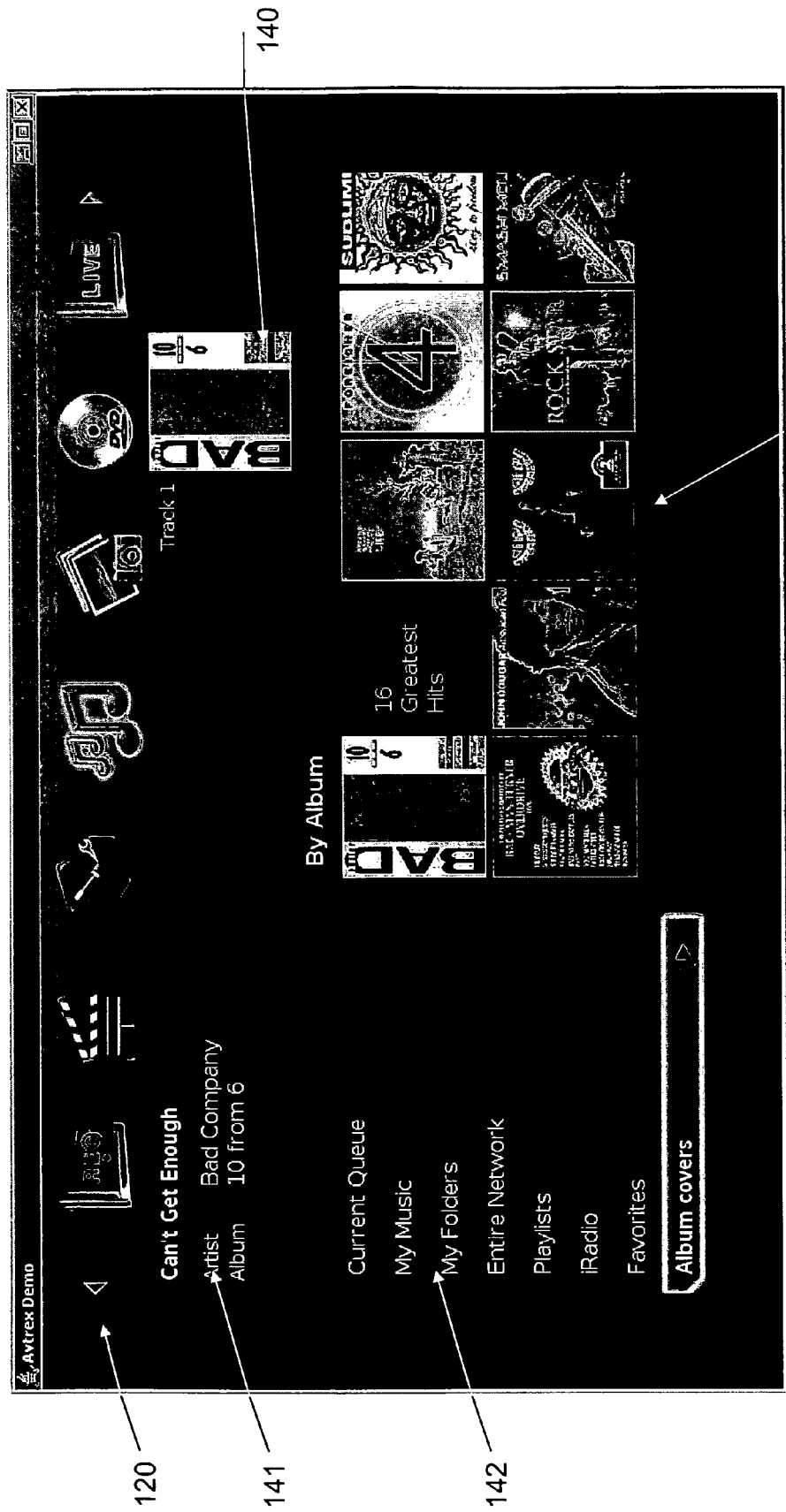
FIG. 4j is a graphical representation of the navigation and program guide user interface of the present invention where a music icon is selected from a navbar user interface, a location "Album covers" is selected, and a variety of album cover art is displayed.

FIGS. 4g, 4i, and 4j depict the selection of the additional locations listed in navigation column 142 and the resulting music file menus.

Figure 5A:
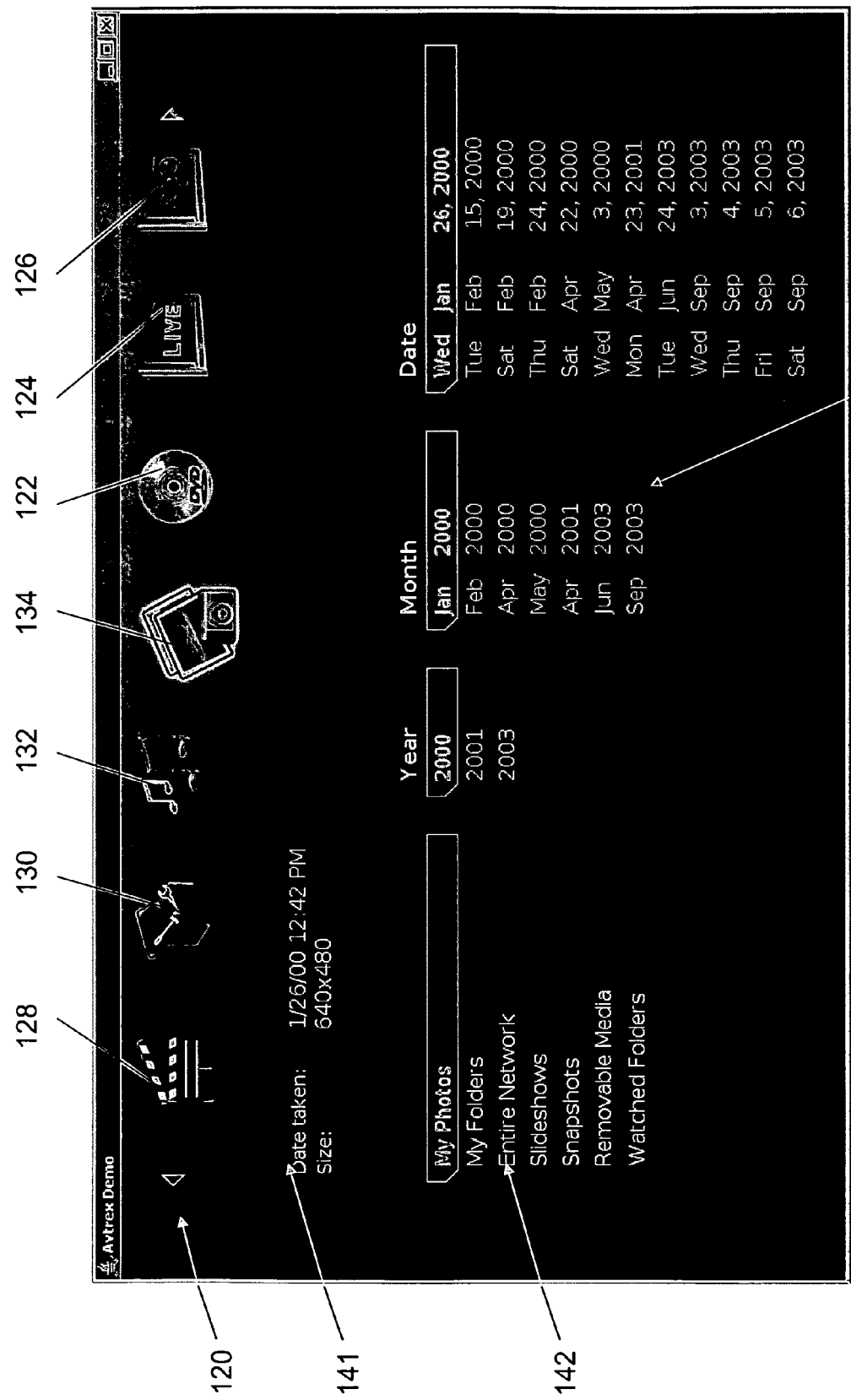
FIG. 5a is a graphical representation of one embodiment of the navigation and program guide user interface of the present invention where a photo icon is selected from a navbar user interface.

Referring now to FIG. 5a, photo icon 134 of navbar user interface 120 is selected as indicated by its central location in navbar user interface 120 and by the colored border appearing around the icon image. Navigation column 142 is populated with locations of available photo files, and menus are presented in menu display area 143. The photo files may be any of a variety of well-known file formats such as JPEG, TIF, GIF, and others.

Figure 5B:
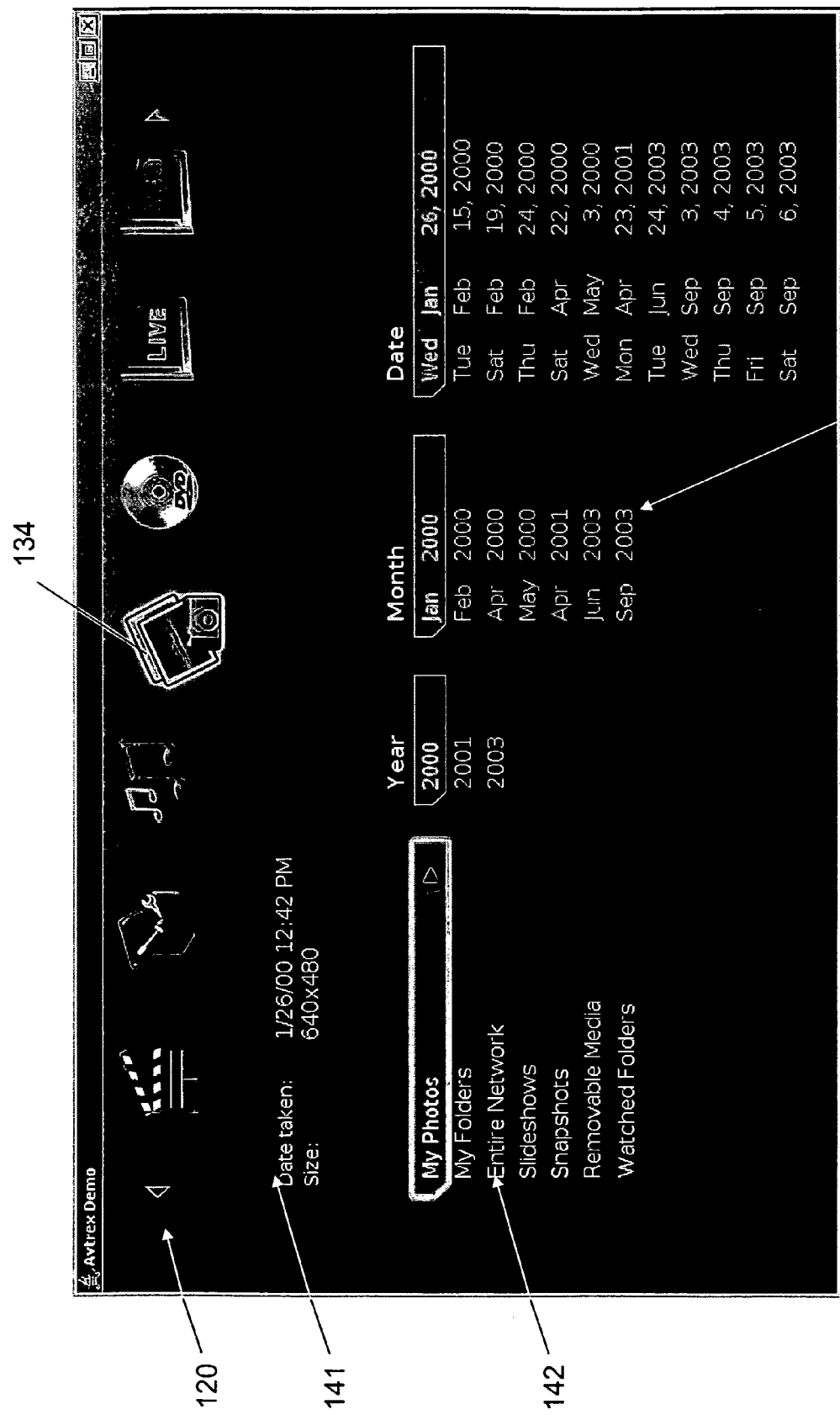
FIG. 5b is a graphical representation of the navigation and program guide user interface of the present invention where a photo icon is selected from a navbar user interface and a location "My Photos" is selected.

As depicted in FIG. 5b, when location "My Photos" is selected from navigation column 142, menus "Year," "Month," and "Date" are presented in menu display area 143. Selecting the appropriate date using these menus allows a user to view photo files categorized by assigned dates.

Figure 5C:
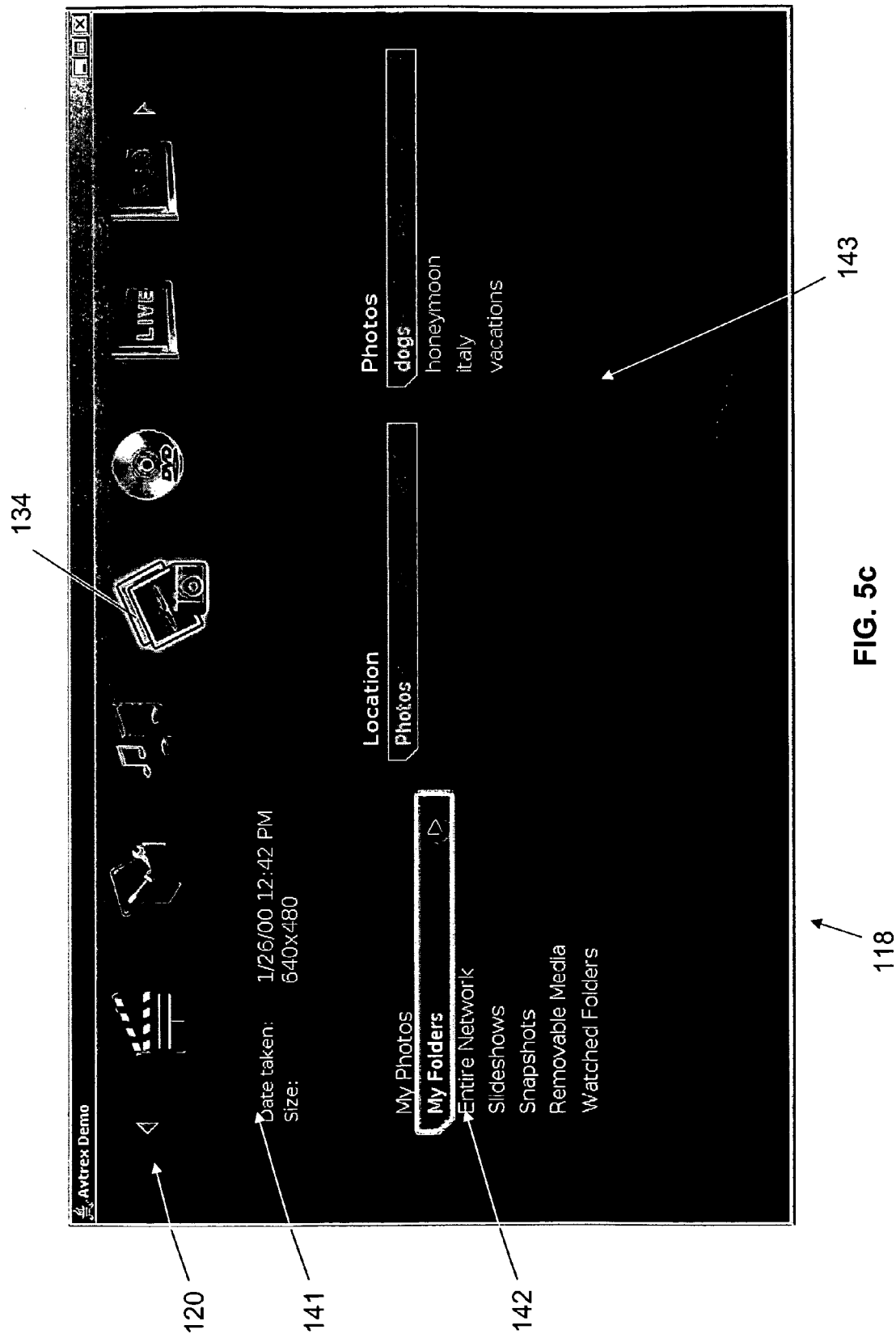
FIG. 5c is a graphical representation of the navigation and program guide user interface of the present invention where a photo icon is selected from a navbar user interface and a location "My Folders" is selected.

Alternatively, as depicted in FIG. 5c, when "My Folders" is selected, a user may navigate the menus appearing in menu display area 143 to find and display photo files identified by folder. In this embodiment, a folder "Photos" contains photo files "dogs," "honeymoon," "italy," and "vacations." A user may view any of the photo files by selecting the photo name appearing on the navigation and program guide user interface 118.

Figure 5D:
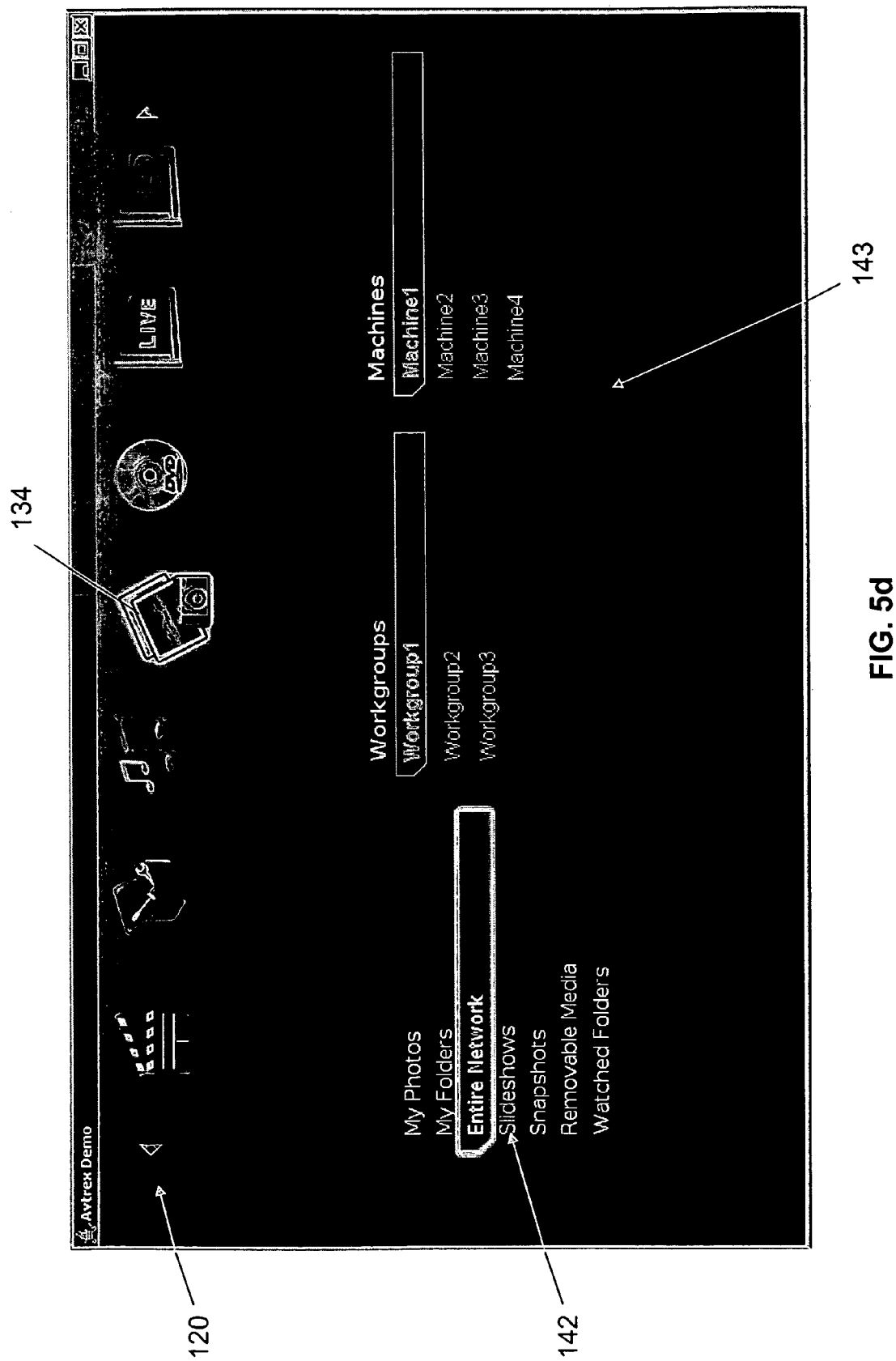
FIG. 5d is a graphical representation of the navigation and program guide user interface of the present invention where a photo icon is selected from a navbar user interface and a location "Entire Network" is selected.

Similarly, photos stored on remote devices may be accessed using navigation column 142 as exemplified in FIG. 5d. As described previously, navigation column 142 may present "Entire Network" or other locations enabling a user to locate and access media files 102 located on other devices. In this embodiment, photo files stored on networked devices may be accessed and viewed via the menu choices "Workgroup" and "Machines" depicted in FIG. 5d.

Selecting "Removable Media" from navigation column 142 presents menus relating to photos located on media storage devices attached to the media device currently in use. For example, a removable "thumb drive" or "flash drive" containing photo files may be plugged into the media device's USB port and viewed using the navigation and program guide user interface 118.

In this embodiment, other menu choices offered in navigation column 142 include "Slideshows," "Snapshots," and "Watched Folders." Selecting these locations or menu choices results in menus appearing in menu display area 143, ultimately allowing a user access to even more photo files and functions.

Figure 6:
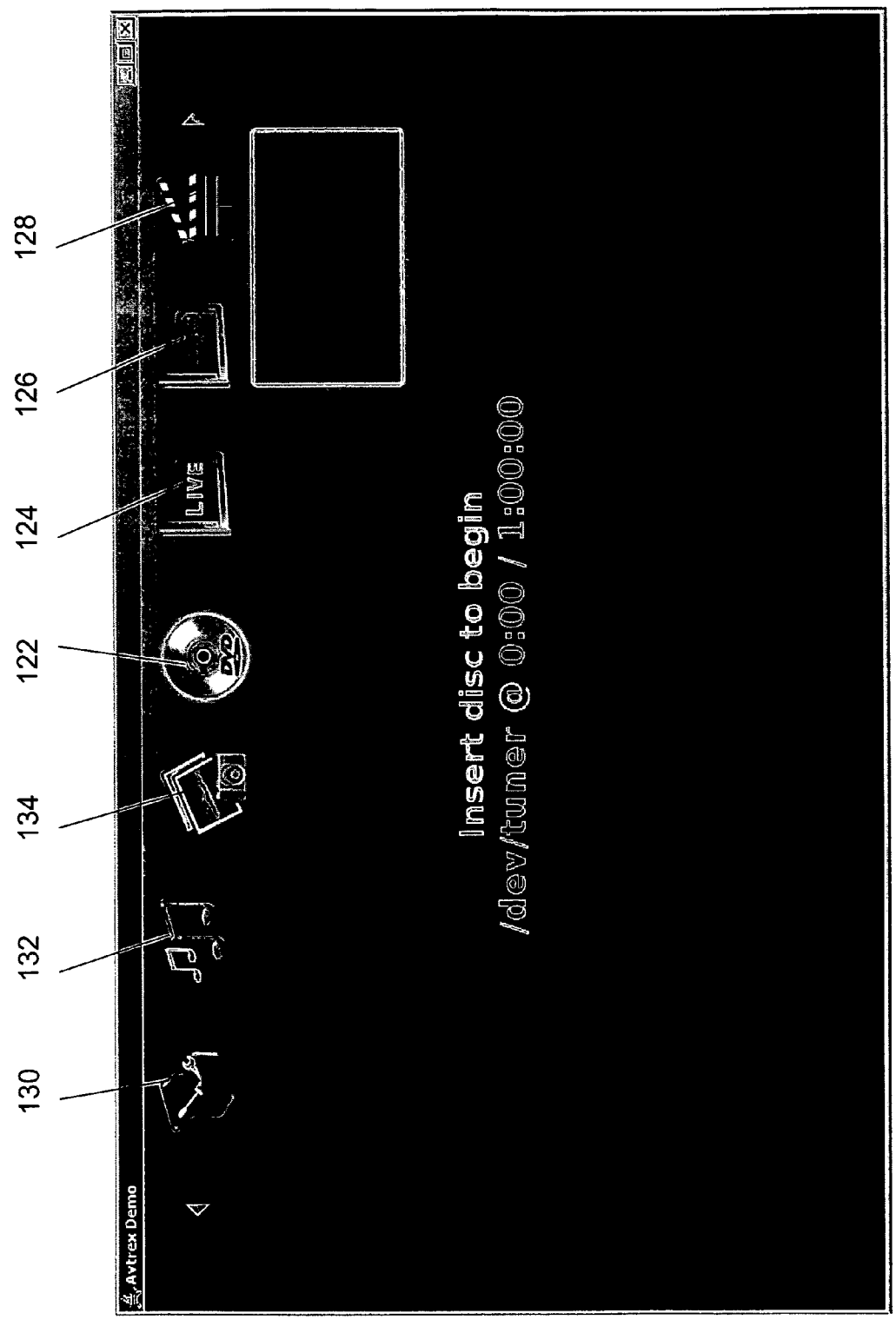
FIG. 6 is a graphical representation of the navigation and program guide user interface of the present invention where a DVD icon is selected from a navbar user interface.

Referring now to FIG. 6, navigation and program guide user interface 118 supports viewing media files 102 stored on digital video discs (DVDs) and played on a media device such as a DVD player or DVR. DVD icon 122 is selected, highlighted with a colored border, and appears at the center of navbar user interface 120. In this embodiment, navigation column 142 and menus are presented after inserting the DVD as indicated by the message "Insert disc to begin." After insertion of a DVD, a navigation column 142 and associated menus are presented to allow a user to play the media files located on the DVD.

Figure 7:
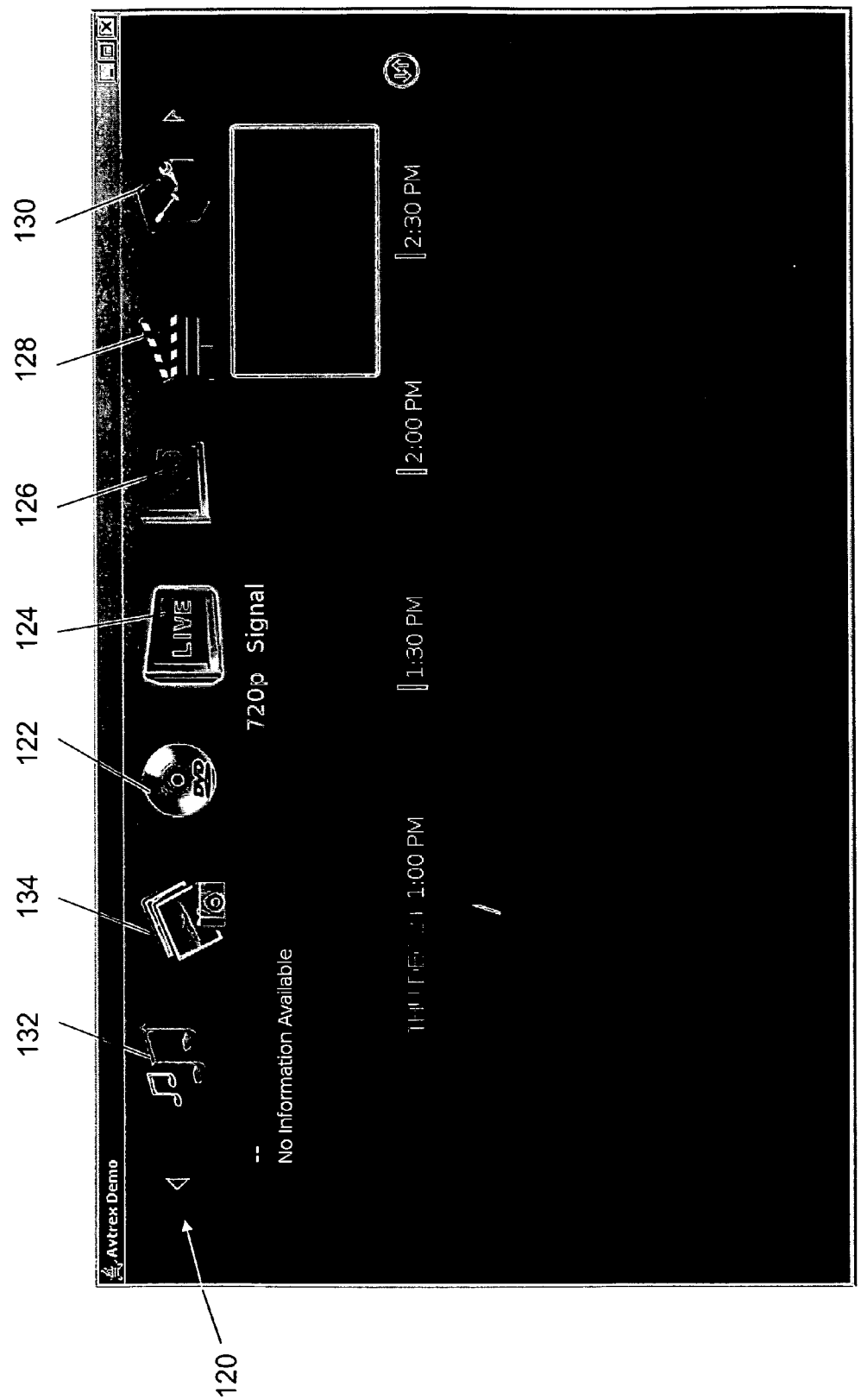
FIG. 7 is a graphical representation of the navigation and program guide user interface of the present invention where a program record icon is selected from a navbar user interface.

Referring now to FIG. 7, in one embodiment, navigation and program guide user interface 118 also supports viewing live television programs. When television icon 124 is selected, program information may be presented in program data display area 141 and a graphic may be presented in preview window 140. Date, time, and signal strength information are typically presented below navbar user interface 120 as depicted. Depending on the media device used to receive the television broadcast, additional icons and menus may also be presented by navigation and program guide user interface 118 allowing a user to change channels, control volume, and so on. After selecting a desired television program using navigation and program guide user interface 118, the program appears on screen of the media device in use.

In another embodiment, the television viewing portion of navigation and program guide user interface 118 is updated and populated over a network or Internet connection from an electronic program guide database or server. Examples of such electronic program guide interfaces are shown and described in U.S. Publ. Patent Appl No. 2004/0068742 A1 and U.S Pat. Nos. 5,585,838, 5,594,509, 5,619,249 and 6,832,386, the disclosures of which are hereby incorporated by reference. In one embodiment, other information such as times and locations of movies playing in a local region may also be displayed on navigation and program guide user interface 118.

Figure 8A:
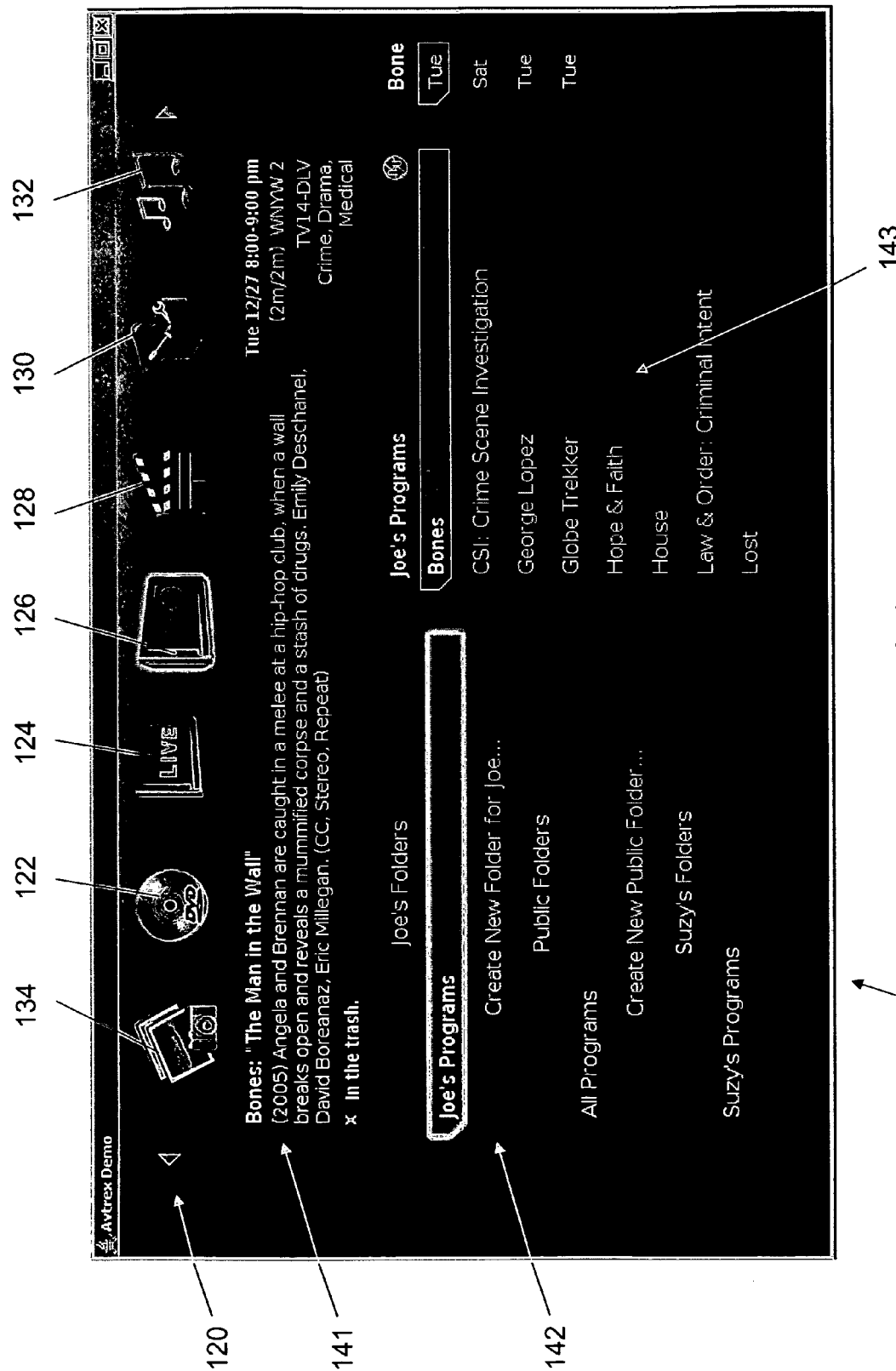
FIG. 8a is a graphical representation of the navigation and program guide user interface of the present invention where a live television icon is selected from a navbar user interface.

Referring now to FIG. 8a, in addition to live television, navigation and program guide user interface 118 supports the recording of television programs for personal viewing. When program record icon 126 is selected, navigation column 142 presents a listing of available media file folders. In this example embodiment, navigation column 142 is named "Joe's Folders" and presents available folders "Joe's Programs," "All Programs," and "Suzy's Programs." Additional folders may be created by selecting "Create New Folder for Joe" or "Create New Public Folder" and so on.

Program information is presented in the program data display area 141. In this embodiment, a television program, episode title, and episode summary are presented. Also presented are the date and time of broadcast, station, and program category. As described earlier, this information may be populated from an electronic program guide database or server.

Figure 8B:
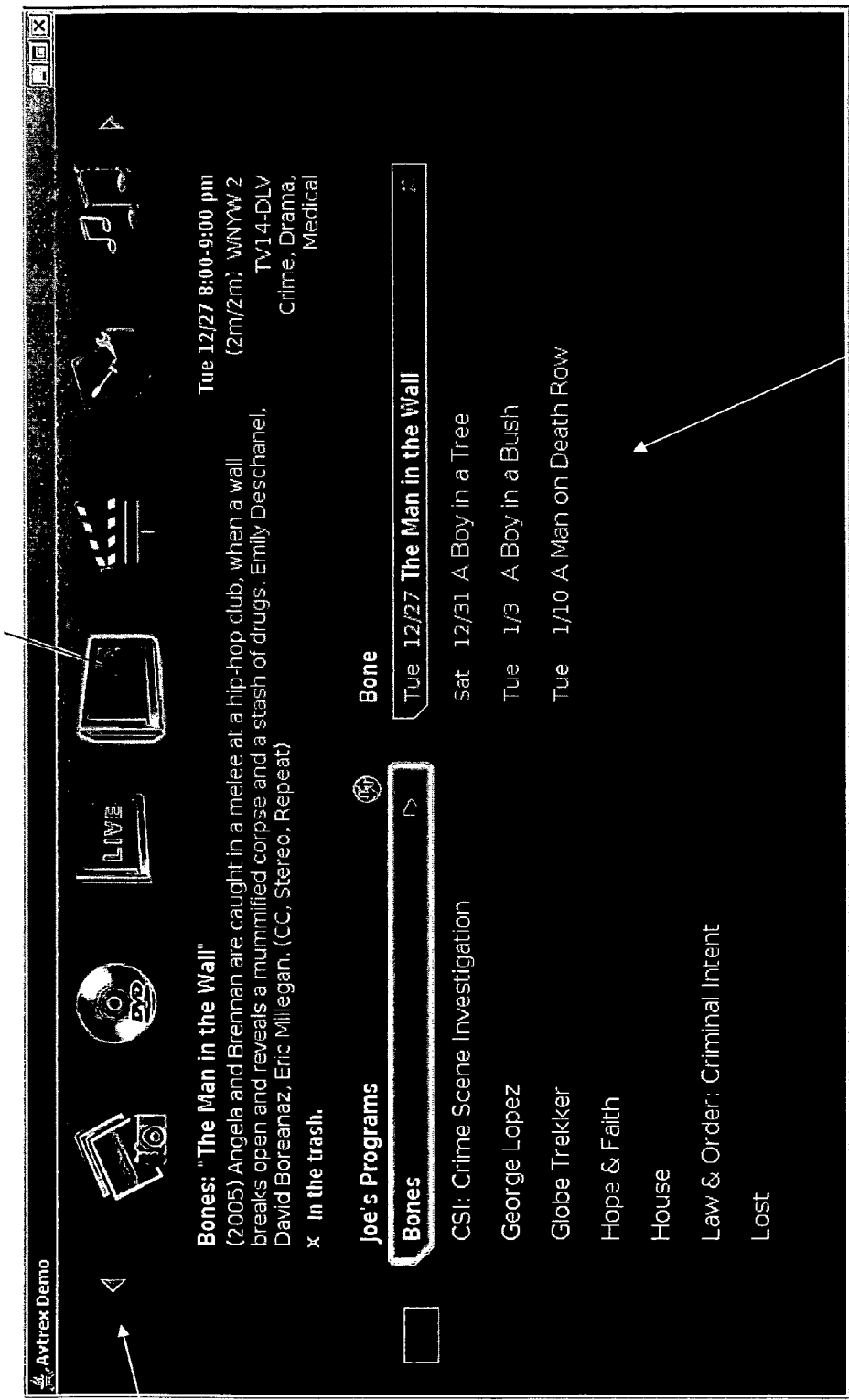
FIG. 8b is a graphical representation of the navigation and program guide user interface of the present invention where a live television icon is selected from a navbar user interface and a television program is selected from a navigation column.
Figure 8C:
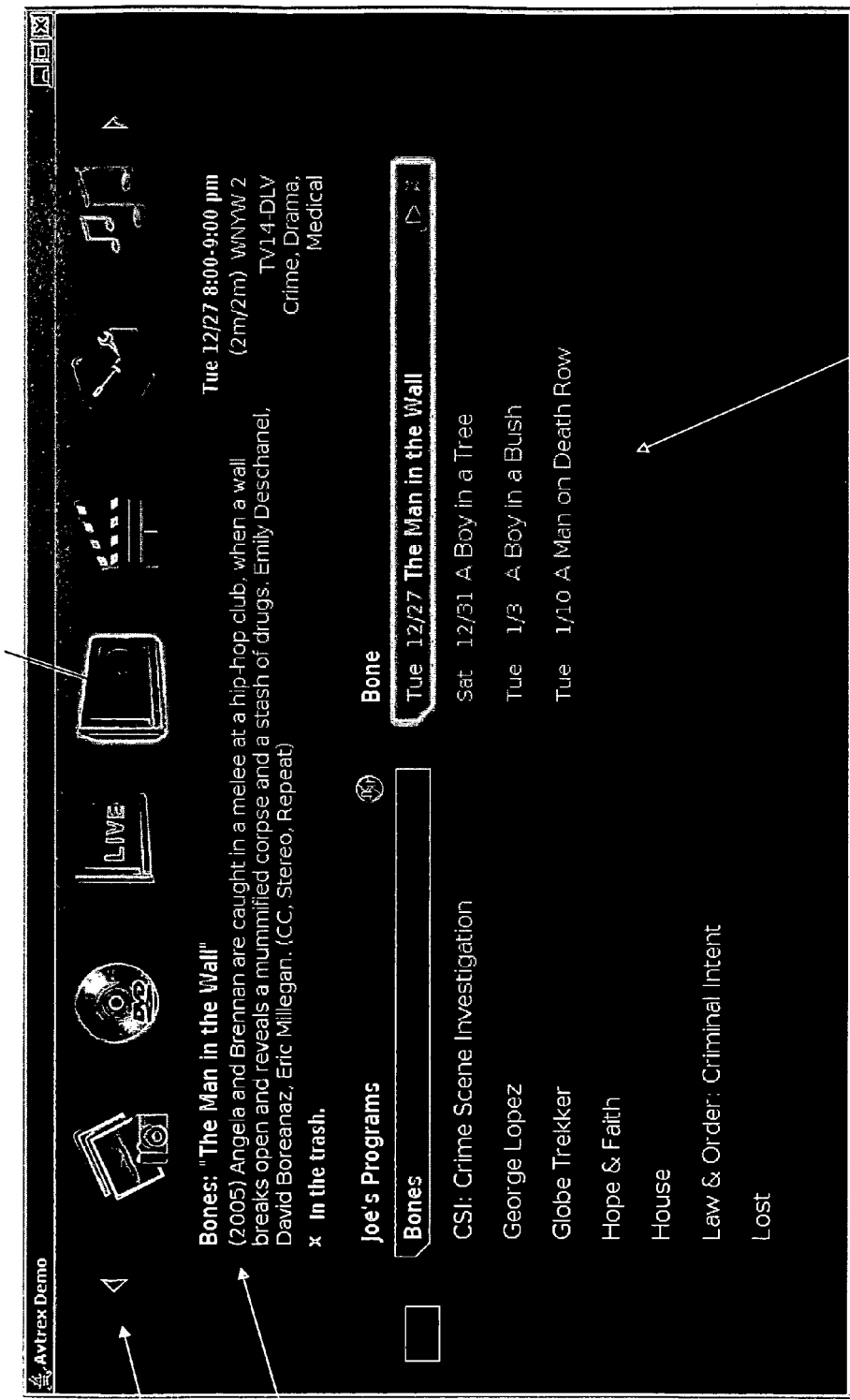
FIG. 8c is a graphical representation of the navigation and program guide user interface of the present invention where a live television icon is selected from a navbar user interface and a television program episode is selected from a menu of television program episodes.

When a program folder is selected, its contents are displayed in menu display area 143. In the embodiment depicted in FIGS. 8a to 8c, the contents of the folder "Joe's Programs" are listed started with the program "Bones." A sub-menu listing the available episodes of the selected program are presented in menu format adjacent the program menu. In this example, episodes are listed chronologically by date, with "The Man in the Wall" as the first episode presented.

Figure 8D:
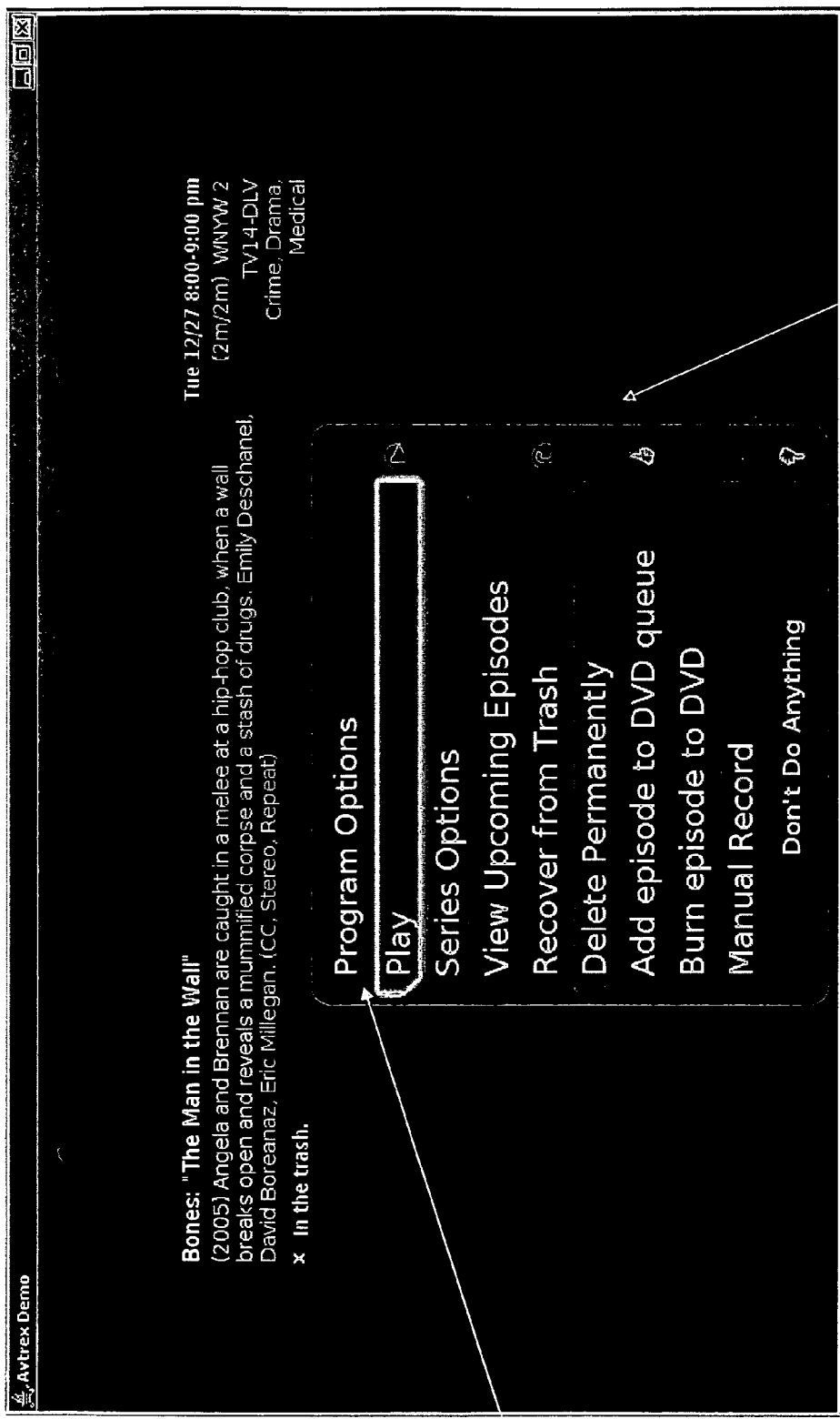
FIG. 8d is a graphical representation of representation of the navigation and program guide user interface of the present invention where a live television icon is selected from a navbar user interface and a program options menu is displayed.

Episodes presented may refer to video files of previously recorded episodes, or episodes to be broadcast at a future date. Referring to FIG. 8d, for example, when the episode "The Man in the Wall" is selected, "Program Options" menu 150 is presented on navigation and program guide user interface 118. This menu offers a user many options related to viewing and recording the episode. A user may view the prerecorded program on the screen of the media device (if it is in fact already recorded), record an upcoming episode, record the program manually, and other functions. Other viewing and recording functions may be presented in other embodiments of navigation and program guide user interface 118.

Referring now to FIGS. 9a to 9e, navigation and program guide user interface 118 provides a set of functional "tools" when tools icon 130 is selected. When tool icon 130 is selected, navigation column 142 presents functions and controls relating to picture quality, program controls, system, and other media device operations and media content properties.

Figure 9A:
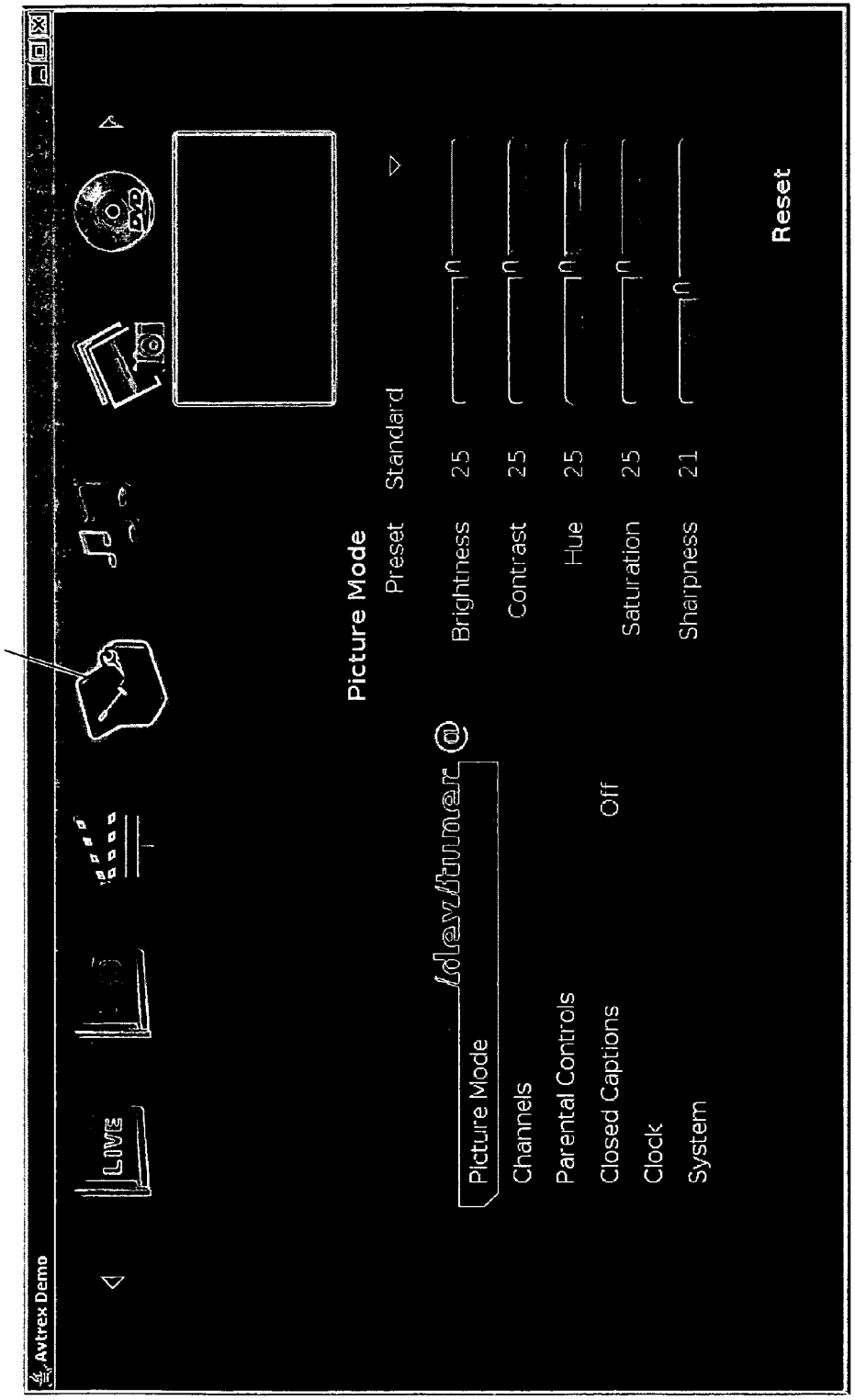
FIG. 9a is a graphical representation of the navigation and program guide user interface of the present invention where a tool icon is selected from a navbar user interface.
Figure 9B:
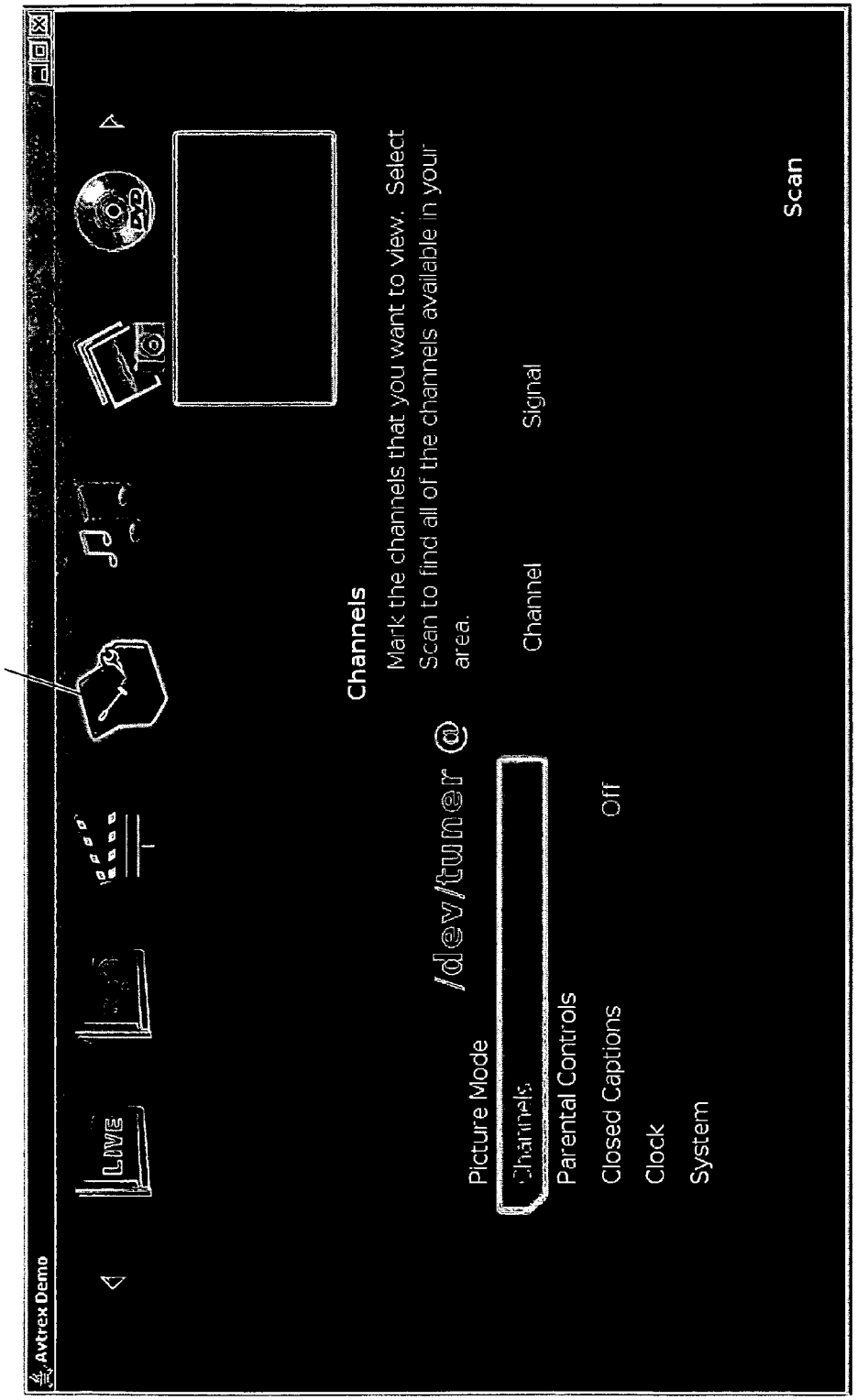
FIG. 9b is a graphical representation of the navigation and program guide user interface of the present invention where a tool icon is selected from a navbar user interface and a "Channels" tool menu is displayed.
Figure 9C:
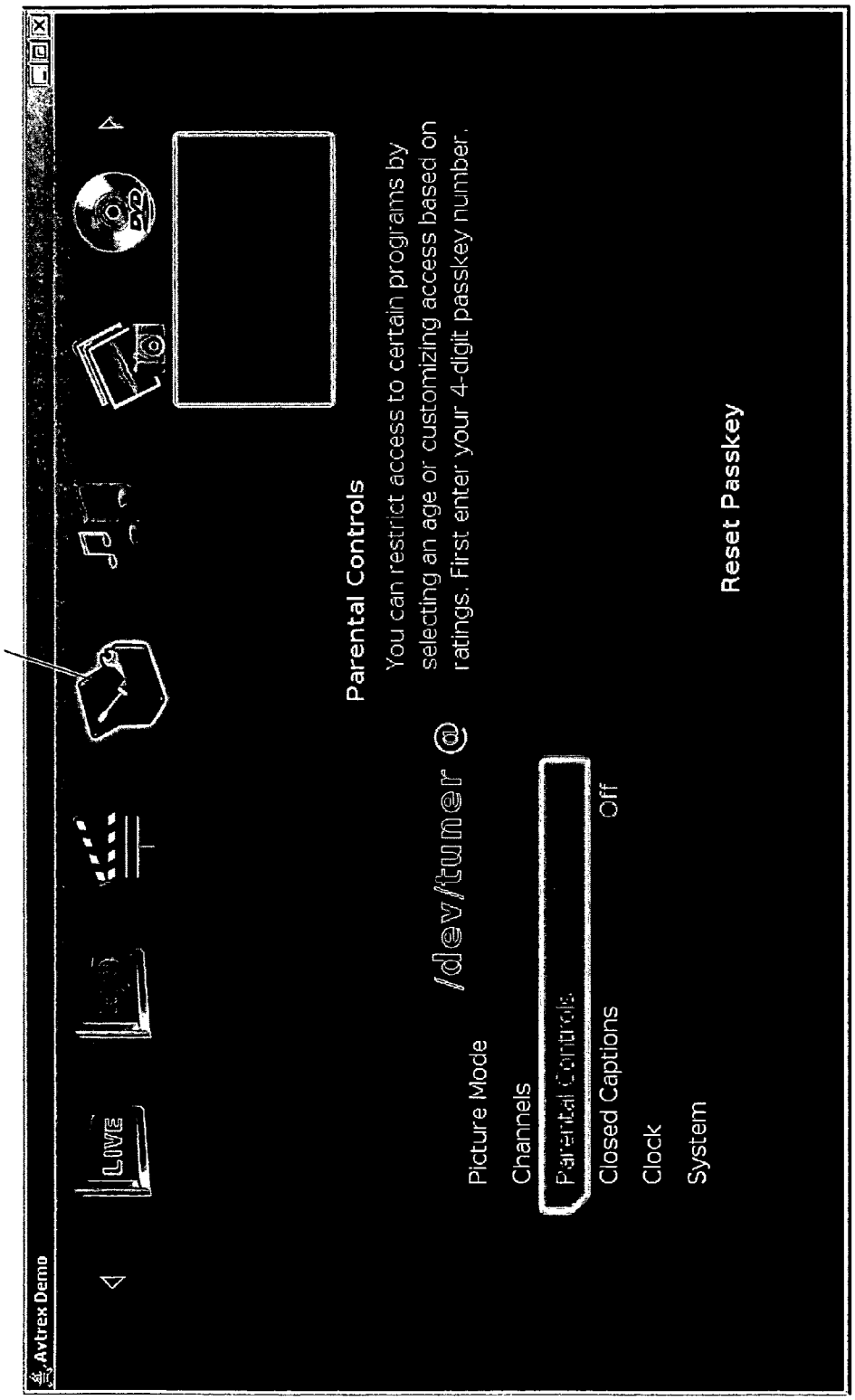
FIG. 9c is a graphical representation of the navigation and program guide user interface of the present invention where a tool icon is selected from a navbar user interface and a "Parental Controls" tool menu is displayed.
Figure 9D:
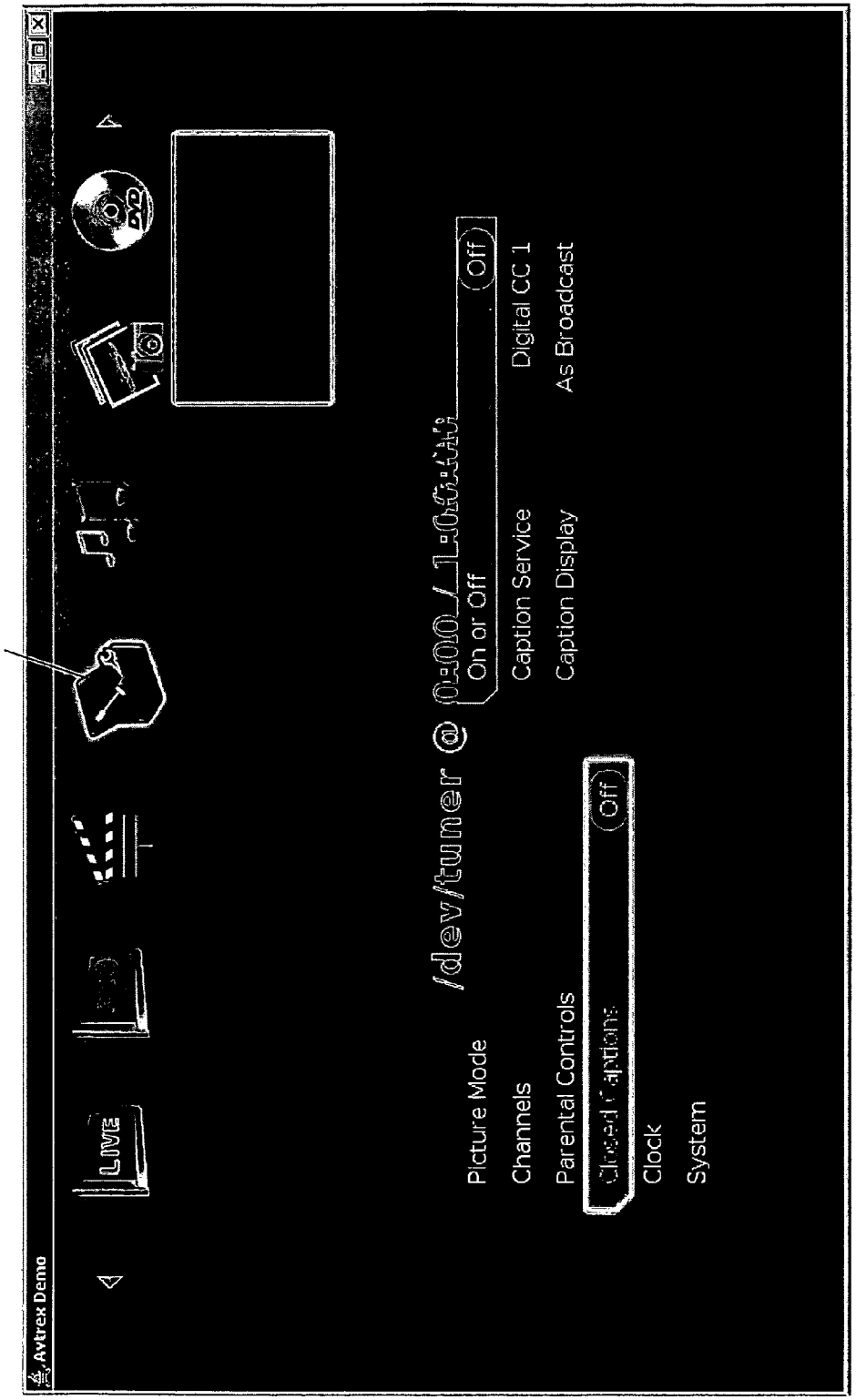
FIG. 9d is a graphical representation of the navigation and program guide user interface of the present invention where a tool icon is selected from a navbar user interface and a "Closed Captions" tool menu is displayed.
Figure 9E:
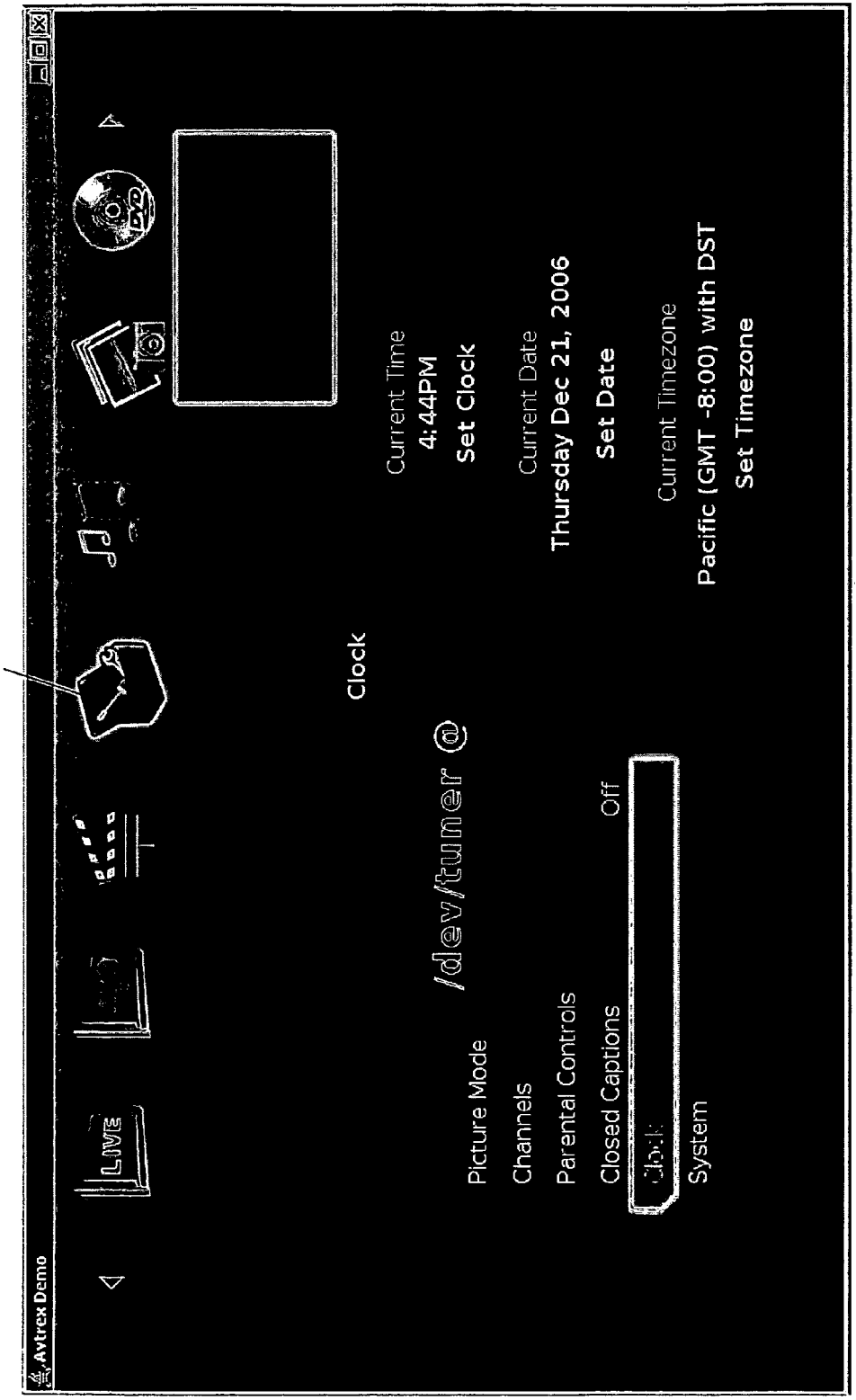
FIG. 9e is a graphical representation of the navigation and program guide user interface of the present invention where a tool icon is selected from a navbar user interface and a "Clock" tool menu is displayed.

For example, "Picture Mode" depicted in FIG. 9a enables a user to adjust the picture quality. "Channels" depicted in FIG. 9b enables a user to scan channels, mark certain channels for viewing, change channels, and more. "Parental Controls" depicted in 9c enables a user to restrict access to certain programs. "Closed Captions" depicted in 9d turns captions on and off. "Clock" depicted in 9e adjusts time and date settings.

Figure 10:
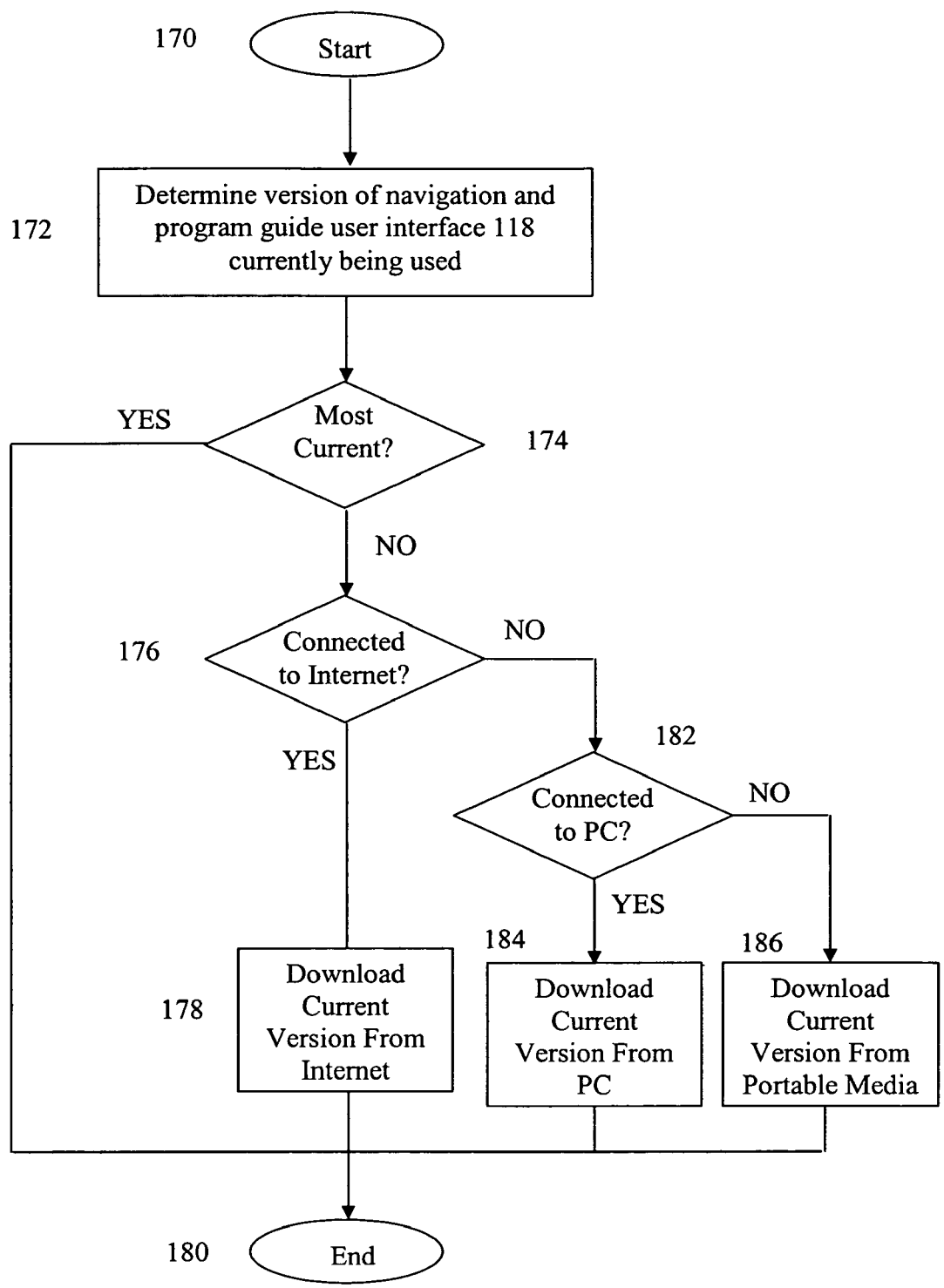
FIG. 10 is a flowchart of the navigation and program guide user interface update process.

Referring now to FIG. 10, in one embodiment, navigation and program guide user interface 118 may be upgradeable. As newer versions of navigation and program user interface 118 become available, older versions may be updated with newer versions. Means of updating navigation and program guide user interface 118 include connecting to a website via an Internet connection and downloading all or part of the latest version, by connecting to a PC via a USB port or via other wired or wireless connection, by downloading the new version directly from portable media such as a CD, thumb drive, and so on.

The flowchart of FIG. 10 depicts one embodiment of the update process. Following the start of the process at 170, the version of navigation and program user interface 118 currently in use by the media device is determined at step 172. This may be accomplished manually by a consumer, or automatically through connection to another media device, PC, or a website on the Internet. At step 174, the version in use is compared to the current version. As with the previous step, step 174 may be accomplished manually or automatically. If the version in use by the media device is not the most current version, and at step 176 it is determined that the device is connected to the Internet, a new version may be downloaded from an Internet website.

If the media device is not connected to the Internet, and at step 182 the media device can be and is connected to a PC, navigation and program guide user interface 118 may be updated at step 184 via software stored on the hard disk drive of the PC, or via a CD, portable drive or other device also connected to the PC. Finally, if navigation and program user interface 118 is neither connected to the Internet or a PC, an updated version may be downloaded at step 185 from a portable media source.

Figure 11:
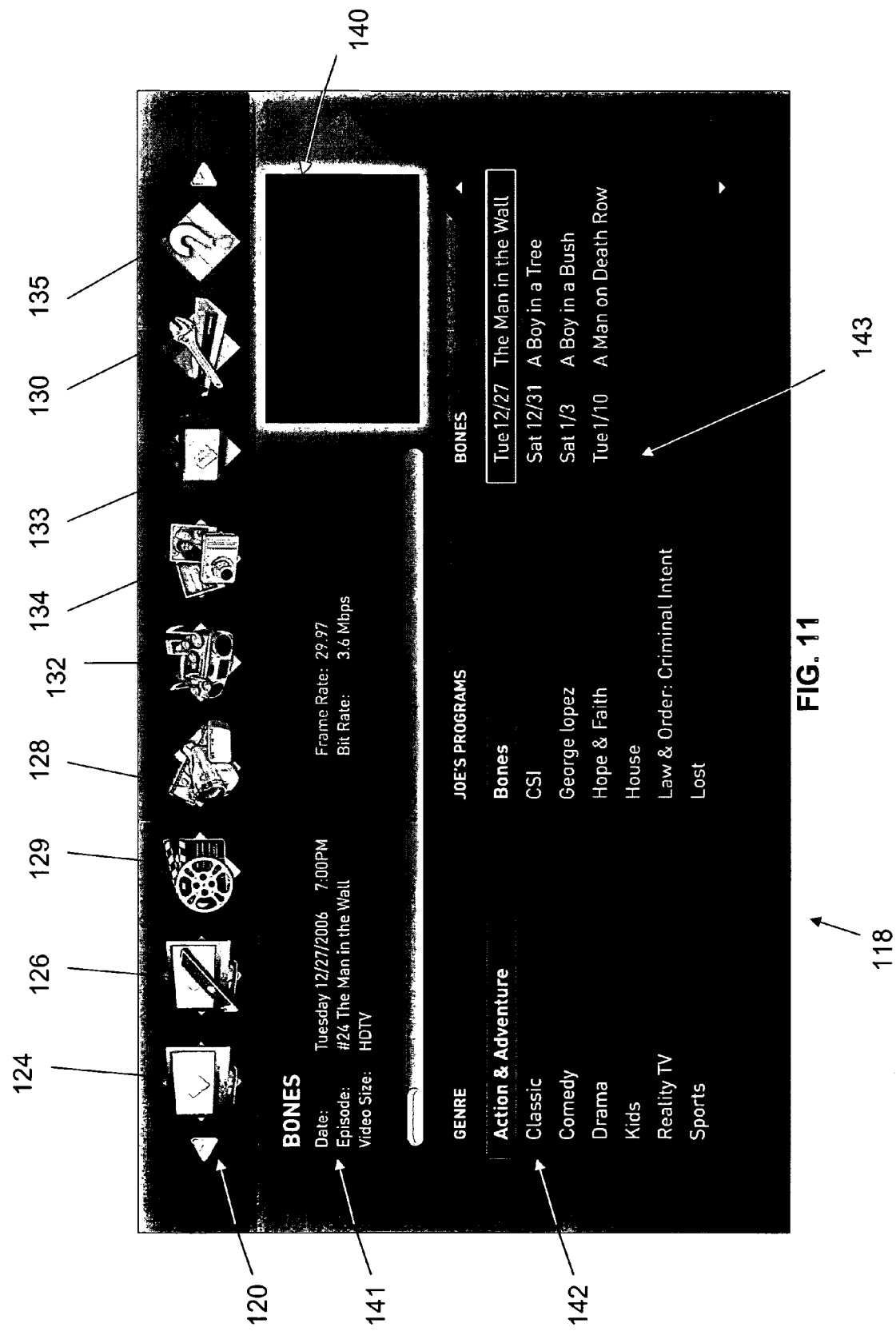
FIG. 11 is a graphical representation of an updated and upgraded navigation and program guide user interface that includes nine media icons.

Referring now to FIG. 11, a navigation and program guide user interface 118 may be updated or upgraded according to the steps described in FIG. 10. In the previously described embodiment of FIG. 3a, a navbar user interface 120 included seven media icons. In the embodiment depicted in FIG. 11, navbar user interface 120 now includes nine media icons. New media icons, portable media player icon 133 and help icon 135, have been added through the updating process. In addition to adding new icons, the updated version of navigation and program user interface 118 includes changes to the graphical appearance of several of the presented media icons.

The updated and upgraded navigation and program guide user interface 118 may also include enhancements to media device functionality and operation and changes to the appearance and content presented in preview window 140, program data display area 141, navigation columns 142, and menu display area 143.

Although the present invention has been described with respect to the various embodiments, it will be understood that numerous insubstantial changes in configuration, arrangement or appearance of the elements of the present invention can be made without departing from the intended scope of the present invention. Accordingly, it is intended that the scope of the present invention be determined by the claims as set forth.

The invention claimed is:

1. A method of providing a browserless ubiquitous navigation and program guide user interface that is persistent and common across a heterogeneous multitude of digital media devices comprising:

causing a browserless navbar user interface to persistently display across an edge portion of a display for each of the heterogeneous multitude of digital media devices when the digital media device is operating in a mode other than a full screen display of digital media content, the browserless navbar user interface being persistent and common across the devices and presenting a limited set of icons associated with a common set of navigation and media guide interfaces for different kinds of digital media content and device operations that are common across the heterogeneous multitude of digital media devices;

operating the browserless navbar user interface in a scrolling manner to display the limited set of icons representing a common set of navigation and media guide interfaces for a desired one of the different kinds of digital media content and device operations by selecting an associated one of the limited set of icons; and in response to selecting the associated one of the limited set of icons for the desired one of the different kinds of digital media content and device operations from the common set of navigation and media guide interfaces, displaying a browserless navigation and media guide user interface in a grid format that is consistent across the heterogeneous multitude of digital media devices.

2. The method of claim 1 wherein the step of presenting the limited set of icons includes presenting at least three icons selected from the set comprising: live television, recorded television, recorded video, personal video, music, photos, personal media player, device operation and device information.

3. The method of claim 1 wherein the step of presenting the limited set of icons presents for each of a plurality of different platforms of the heterogeneous multitude of digital media devices a subset of between three to fifteen graphical icon images that are identical for that platform such that different platforms have different numbers of graphical icon images in the subset for that platform but the graphical icon images are common across the heterogeneous multitude of digital media devices.

4. The method of claim 1 wherein the step of causing the navbar user interface to persistently display across an edge portion of a display for each of the heterogeneous multitude of digital media devices is automatically performed for different platforms of digital media devices selected from a group consisting of: digital entertainment center, digital video disc player, digital video recorder, compact disc player, digital music player, personal media player, set top box, video camera, digital camera, digital stereo and digital radio.

5. The method of claim 1 wherein different platforms of digital media devices have displays with different screen sizes, the different screen sizes being measured diagonally and ranging from 2½" to at least 12" and wherein the step of causing the navbar user interface to persistently display across an edge portion of the display includes scaling the navbar user interface to a dimension of the edge of the display for the screen size of a given platform of digital media device such that a smaller number of icons is displayed for a screen size having a smaller dimension of the edge and a larger number of icons is displayed for a screen size having a larger dimension of the edge, but a scrolled order of the icons is the same regardless of the dimension of the edge.

6. The method of claim 1 wherein the step of causing the navbar user interface to persistently display across an edge portion of a display that is a topmost edge of the display for each of the heterogeneous multitude of digital media devices and the step of operating the navbar user interface in a scrolling manner is operated in a left-right circular scrolling manner.

7. The method of claim 1 wherein the step of displaying the navigation and media guide interface for the desired one of the different kinds of digital media content and device operations is presented in a grid format that includes a selected content window, an optional preview window and available digital media content organized into at least two columns of information related to a selectable set of the available digital media content.

8. A machine system including a ubiquitous navigation and program guide user interface that is common across a heterogeneous multitude of digital media devices comprising:

a browserless navbar user interface that is persistently displayed across an edge portion of a display for each of the heterogeneous multitude of digital media devices when the digital media device is operating in a mode other than a full screen display of digital media content, the browserless navbar user interface being persistent and common across the devices and including a limited set of icons associated with a common set of browserless navigation and media guide interfaces for different kinds of digital media content and device operations that are common across the heterogeneous multitude of digital media devices;

a browserless navigation and media guide interface for each of the different kinds of digital media content and device operations that is selectively displayable across a portion of the display other than the edge portion and presents information about the digital media content and device operation in a grid format that is consistent across the heterogeneous multitude of digital media devices; and a user interface device that operates the browserless navbar user interface to:

display the limited set of icons in a scrolling manner in a circular endless buffer in which at least three of the icons are displayed on the display; and select one of the common set of navigation and media guide interfaces for a desired one of the different kinds of digital media content and device operations by selecting an associated one of the common and limited set of icons.

9. The system of claim 8 wherein the limited set of icons includes at least three icons selected from the set comprising: live television, recorded television, recorded video, personal video, music, photos, personal media player, device operation and device information.

10. The system of claim 8 wherein the limited set of icons includes for each of a plurality of different platforms of the heterogeneous multitude of digital media devices a subset of between three to fifteen graphical icon images that are identical for that platform such that different platforms have different numbers of graphical icon images in the subset for that platform but the graphical icon images are common across the heterogeneous multitude of digital media devices.

11. The system of claim 8 wherein a plurality of different platforms of digital media devices that comprise the heterogeneous multitude of digital media devices are selected from a group consisting of: digital entertainment center, digital video disc player, digital video recorder, compact disc player, digital music player, personal media player, set top box, video camera, digital camera, digital stereo and digital radio.

12. The system of claim 8 wherein different platforms of digital media devices that comprise the heterogeneous multitude of digital media devices have displays with different screen sizes, the different screen sizes being measured diagonally and ranging from 2½" to at least 12" and wherein the navbar user interface is scaled to a dimension of the edge of the display for the screen size of a given platform of digital media device such that a smaller number of icons is displayed for a screen size having a smaller dimension of the edge and a larger number of icons is displayed for a screen size having a larger dimension of the edge, but a scrolled order of the icons is the same regardless of the dimension of the edge.

13. The system of claim 8 wherein the edge portion of the display is a topmost edge of the display for each of the heterogeneous multitude of digital media devices and the scrolling manner is operated in a left-right circular scrolling manner.

14. The system of claim 8 wherein the grid format includes a selected content window, an optional preview window and available digital media content organized into at least two columns of information related to a selectable set of the available digital media content.

15. A heterogeneous multitude of digital media devices that implement a browserless ubiquitous navigation and program guide user interface comprising:

a plurality of different platforms of digital media devices that comprise the heterogeneous multitude of digital media devices, each of the different platforms being selected from the set consisting of: digital entertainment center, digital video disc player, digital video recorder, compact disc player, digital music player, personal media player, set top box, video camera, digital camera, digital stereo and digital radio;

a browserless navbar user interface that is persistently displayed across an edge portion of a display for each of the heterogeneous multitude of digital media devices when the digital media device is operating in a mode other than a full screen display of digital media content, the browserless navbar user interface being persistent and common across the devices and including a limited set of icons associated with a common set of browserless navigation and media guide interfaces for different kinds of digital media content and device operations that are common across the heterogeneous multitude of digital media devices;

a browserless navigation and media guide interface for each of the different kinds of digital media content and device operations that is selectively displayable across a portion of the display other than the edge portion and presents information about the digital media content and device operation in a grid format that is consistent across the heterogeneous multitude of digital media devices; and a user interface device that operates the browserless navbar user interface to:

display the limited set of icons in a scrolling manner in a circular endless buffer in which at least three of the icons are displayed on the display; and select one of the common set of navigation and media guide interfaces for a desired one of the different kinds of digital media content and device operations by selecting an associated one of the limited set of icons.

16. The digital media devices of claim 15 wherein the limited set of icons includes at least three icons selected from the set comprising: live television, recorded television, recorded video, personal video, music, photos, personal media player, device operation and device information.

17. The digital media devices of claim 15 wherein the limited set of icons includes for each of the plurality of different platforms of the heterogeneous multitude of digital media devices a subset of between three to fifteen graphical icon images that are identical for that platform such that different platforms have different numbers of graphical icon images in the subset for that platform but the graphical icon images are common across the heterogeneous multitude of digital media devices.

18. The digital media devices of claim 15 wherein different ones of the plurality of different platforms have displays with different screen sizes, the different screen sizes being measured diagonally and ranging from 2½" to at least 12" and wherein the navbar user interface is scaled to a dimension of the edge of the display for the screen size of a given platform of digital media device such that a smaller number of icons is displayed for a screen size having a smaller dimension of the edge and a larger number of icons is displayed for a screen size having a larger dimension of the edge, but a scrolled order of the icons is the same regardless of the dimension of the edge.

19. The digital media devices of claim 15 wherein the edge portion of the display is a topmost edge of the display for each of the heterogeneous multitude of digital media devices and the scrolling manner is operated in a left-right circular scrolling manner.

20. The digital media devices of claim 15 wherein the grid format includes a selected content window, an optional preview window and available digital media content organized into at least two columns of information related to a selectable set of the available digital media content.

\* \* \* \* \*